US012581213B2

(12) United States Patent
Ozone et al.

(10) Patent No.: US 12,581,213 B2
(45) Date of Patent: Mar. 17, 2026

(54) SOLID-STATE IMAGING DEVICE AND METHOD OF CONTROLLING SOLID-STATE IMAGING DEVICE FOR SUPPRESSING DETERIORATION IN IMAGE QUALITY

(71) Applicant: SONY SEMICONDUCTOR SOLUTIONS CORPORATION, Kanagawa (JP)

(72) Inventors: Takayoshi Ozone, Kanagawa (JP); Ikki Hara, Kanagawa (JP); Junichi Sakamoto, Kanagawa (JP); Shinya Sumikura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 186 days.

(21) Appl. No.: 18/260,251

(22) PCT Filed: Jan. 4, 2022

(86) PCT No.: PCT/JP2022/000029
§ 371 (c)(1),
(2) Date: Jul. 3, 2023

(87) PCT Pub. No.: WO2022/153888
PCT Pub. Date: Jul. 21, 2022

(65) Prior Publication Data
US 2024/0064431 A1 Feb. 22, 2024

(30) Foreign Application Priority Data
Jan. 12, 2021 (JP) ................................ 2021-003034

(51) Int. Cl.
*H04N 25/58* (2023.01)
*H04N 23/68* (2023.01)
(Continued)

(52) U.S. Cl.
CPC ......... *H04N 25/58* (2023.01); *H04N 23/6812* (2023.01); *H04N 23/683* (2023.01);
(Continued)

(58) Field of Classification Search
CPC ...... H04N 25/58; H04N 25/40; H04N 25/704; H04N 25/767; H04N 23/6812;
(Continued)

(56) References Cited

U.S. PATENT DOCUMENTS

2012/0320236 A1* 12/2012 Toyoda ................ H04N 5/2625
348/E5.031

FOREIGN PATENT DOCUMENTS

JP        2011-223477 A        11/2011
JP        2013005136 A         1/2013
WO        2017/094229 A1       6/2017

OTHER PUBLICATIONS

International Search Report and Written Opinion of PCT Application No. PCT/JP2022/000029, issued on Mar. 29, 2022, 15 pages of ISRWO.

* cited by examiner

*Primary Examiner* — Nicholas G Giles
(74) *Attorney, Agent, or Firm* — CHIP LAW GROUP

(57) ABSTRACT

Provided is a solid-state imaging device that includes a pixel array unit including a plurality of pixels, a control unit that reads first image data from the pixel array unit in each of a plurality of cycles in one frame, and a processing unit that generates second image data of the one frame on the basis of a plurality of the first image data read in the one frame.

18 Claims, 14 Drawing Sheets

(51) Int. Cl.

| | | |
|---|---|---|
| *H04N 23/745* | (2023.01) | |
| *H04N 25/40* | (2023.01) | |
| *H04N 25/704* | (2023.01) | |
| *H04N 25/767* | (2023.01) | |

(52) U.S. Cl.
CPC ........... *H04N 23/745* (2023.01); *H04N 25/40*
(2023.01); *H04N 25/704* (2023.01); *H04N
25/767* (2023.01)

(58) Field of Classification Search
CPC .. H04N 23/683; H04N 23/745; H04N 23/684;
H04N 25/616; H04N 23/682; H04N
23/6845
See application file for complete search history.

SOLID-STATE IMAGING DEVICE AND METHOD OF CONTROLLING SOLID-STATE IMAGING DEVICE FOR SUPPRESSING DETERIORATION IN IMAGE QUALITY

CROSS REFERENCE TO RELATED APPLICATIONS

This application is a U.S. National Phase of International Patent Application No. PCT/JP2022/000029 filed on Jan. 4, 2022, which claims priority benefit of Japanese Patent Application No. JP 2021-003034 filed in the Japan Patent Office on Jan. 12, 2021. Each of the above-referenced applications is hereby incorporated herein by reference in its entirety.

FIELD

The present disclosure relates to a solid-state imaging device, a method of controlling a solid-state imaging device, and a control program for a solid-state imaging device.

BACKGROUND

In recent years, with the autonomy of mobile bodies such as automobiles and robots and the spread of Internet of Things (IoT) and the like, it is strongly desired to increase the speed and accuracy of image recognition.

CITATION LIST

Patent Literature

Patent Literature 1: JP 2011-223477 A

SUMMARY

Technical Problem

For example, a subject such as a traffic light, an electric bulletin board, or a vehicle light that performs traffic control has various flicker components depending on a light source, a power supply, or the like. When such a subject flickering at a high speed is detected by an image sensor or the like that outputs image data at a predetermined frame rate, problems such as a case where the subject is not detected for a long period of time or a case where the subject is detected as a state in which the subject remains lit for a long period of time may occur due to a relationship between a flickering cycle of the subject and a frame rate of the image sensor.

Such problems can be suppressed by, for example, increasing the exposure time (corresponding to a shutter speed) of the image sensor. However, when the exposure time is increased, a distance by which the subject, the background, and the like move within an angle of view of the image sensor is increased, which may cause a problem that blur occurs in an image acquired by the image sensor.

Deterioration in detection accuracy of a subject having a flicker component and occurrence of blur in an image cause not only deterioration in image quality but also deterioration in recognition accuracy in image recognition. However, as described above, since there is a trade-off relationship between the detection accuracy and the image quality of the subject including the flicker component, there is a problem that the image quality of the image data acquired in the space in which the subject including the flicker component exists may be deteriorated in the related art.

Therefore, the present disclosure proposes a solid-state imaging device, a method of controlling a solid-state imaging device, and a control program for a solid-state imaging device capable of suppressing deterioration in image quality.

Solution to Problem

To solve the problems described above, a solid-state imaging device according to an embodiment of the present disclosure includes: a pixel array unit including a plurality of pixels; a control unit that reads first image data from the pixel array unit in each of a plurality of cycles in one frame; and a processing unit that generates second image data of the one frame based on a plurality of the first image data read in the one frame.

DESCRIPTION OF EMBODIMENTS

Figure 1:
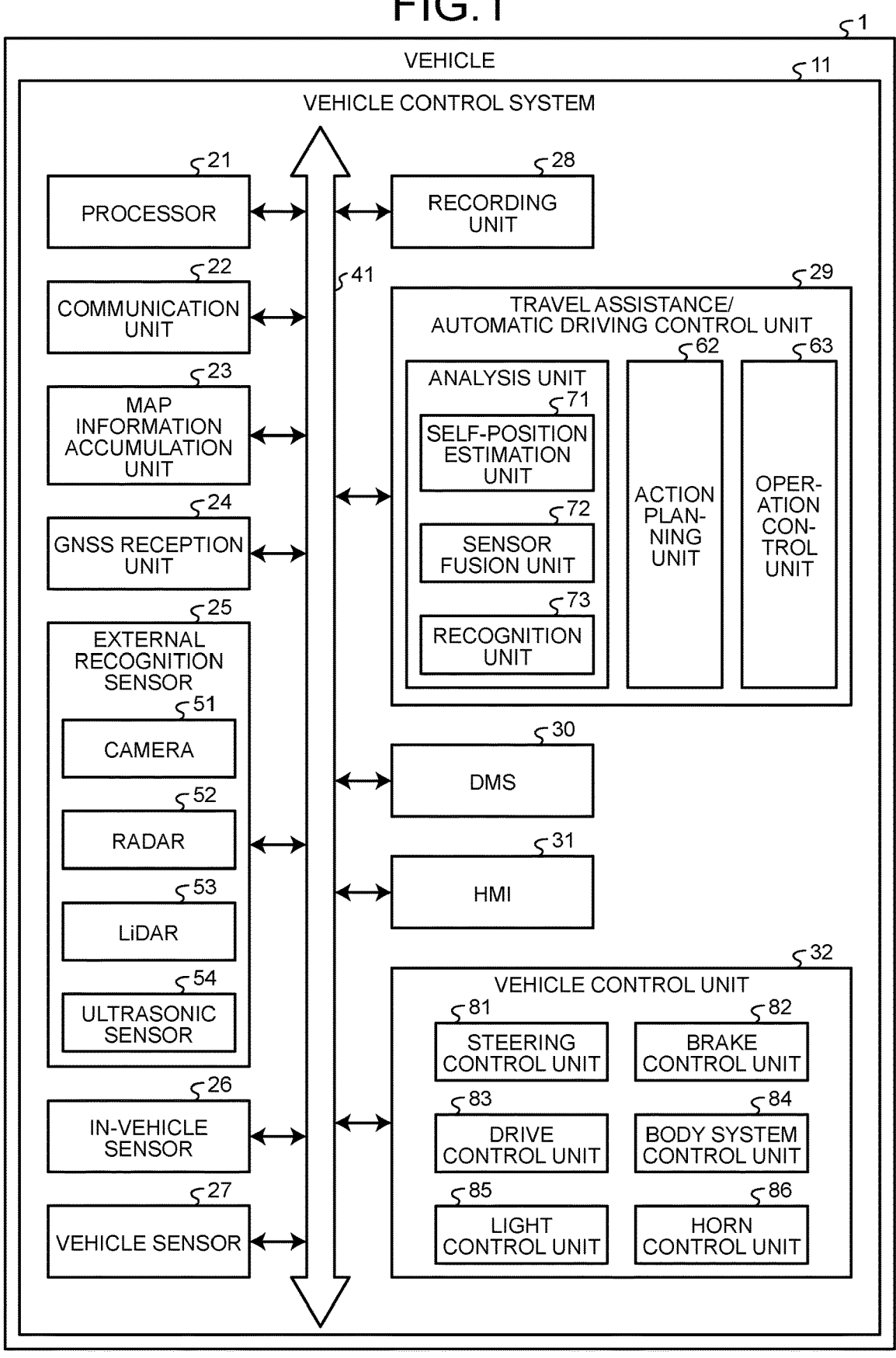
FIG. 1 is a block diagram illustrating a configuration example of a vehicle control system.

Hereinafter, embodiments of the present disclosure will be described in detail with reference to the drawings. Note that, in each of the following embodiments, the same parts are denoted by the same reference signs, and redundant description will be omitted.

Furthermore, the present disclosure will be described according to the following item order.

0. Introduction
1. One embodiment
1.1 Configuration example of vehicle control system
1.2 Configuration example of solid-state imaging device (image sensor)
1.3 Basic operation example (generation of frame data by 4-cycle sequence and DOL synthesis)
1.4 Another countermeasure example of SNR drop
1.5 Detection and removal of flicker
1.6 Shake correction
1.7 Motion vector search (ME)
1.8 Summary
1.9 Modification example
2. Hardware configuration

0. Introduction

An image sensor according to the related art has the following technical problems.

(Flicker Light Source)

In the related art, a problem that a subject is detected as a state in which the subject disappears for a long period of time or the subject is detected as a state in which the subject is lit for a long period of time may occur due to a relationship between a flickering cycle of the subject and a frame rate of the image sensor. Such a problem can be solved by setting the exposure time of the image sensor to long time exposure longer than a flickering cycle of the subject, but a problem such as blur described later can be induced.

(Blurring)

In a case where long-time exposure is adopted in order to enhance the detection accuracy of a flicker light source such as a traffic light or a road sign, by increasing the exposure time, a distance by which a subject, a background, or the like moves within an angle of view of the image sensor becomes long, which may cause a problem that blur occurs in an image acquired by the image sensor. Such a problem can be reduced by shortening the exposure time, but there is a dilemma that the detection accuracy of the flicker light source is reduced instead. Furthermore, in the case of short-time exposure, there may be a problem that visibility of an image acquired under a low illuminance environment such as nighttime or a dark portion is lowered.

(Low Illuminance Performance)

The visibility of an image acquired in a low illuminance environment can be improved by increasing the exposure time, but instead, there is a dilemma that blur occurs in the image acquired by the image sensor. Furthermore, in recent years, since the pixel sensitivity tends to decrease due to the progress of narrowing a pixel pitch, it has become difficult to ensure visibility.

(Dynamic Range)

In addition to these, in recent image sensors, a dynamic range has been improved by a technique such as advancement of a pixel structure or binning, but there is a problem that SNR drop in which SN is deteriorated due to heat generation of a sensor chip itself may occur.

(Compatibility Between Detection Application and Visual Recognition Application)

Furthermore, as a detection frame rate, a frame rate different from a general frame rate for visual recognition (for example, 30 frames per second (fps), 60 fps, or the like) is often used for the reason of suppressing the influence of flicker or the like, and there may be a case where it is difficult to achieve both the detection application and the visual recognition application.

(Influence of Shake)

Moreover, in a case where an image sensor mounted on a moving object such as a vehicle detects a distant subject with high resolution, a detection frame (also referred to as an angle of view) moves following the shake due to vibration or the like of the image sensor itself, and thus, there is a problem that it is difficult to determine the movement of the detected object. Furthermore, in a case where the detection frame greatly moves, a correlation of the images is lost in a time axis direction, and thus, there is a situation in which image recognition needs to be executed with a single image, and there is also a problem that it is difficult to improve the recognition accuracy.

Therefore, in the following embodiments, a solid-state imaging device, a method of controlling a solid-state imaging device, and a control program of a solid-state imaging device capable of simultaneously achieving generation of an image that is not affected by flickering of a flicker light source and detection of the flicker light source will be described with examples. Furthermore, in the following embodiments, a solid-state imaging device, a method of controlling a solid-state imaging device, and a control program of a solid-state imaging device capable of suppressing blur to an extent that does not affect image recognition will be described with examples. Moreover, in the following embodiments, a solid-state imaging device, a method of controlling a solid-state imaging device, and a control program of a solid-state imaging device capable of suppressing deterioration in image quality at low illuminance will be described with examples. Moreover, in the following embodiments, a solid-state imaging device, a method of controlling a solid-state imaging device, and a control program of a solid-state imaging device capable of imaging in a high dynamic range will be described with examples. Moreover, in the following embodiments, a solid-state imaging device, a method of controlling a solid-state imaging device, and a control program of a solid-state imaging device that can be used for both detection application and visual recognition application will be described with examples. Moreover, in the following embodiments, a solid-state imaging device, a method of controlling a solid-state imaging device, and a control program of a solid-state imaging device, which can be expected to improve the accuracy of image recognition, will be described with an example.

1. One Embodiment

Next, an embodiment according to the present disclosure will be described in detail with reference to the drawings.

1.1 Configuration Example of Vehicle Control System

First, a mobile device control system according to the present embodiment will be described. FIG. 1 is a block diagram illustrating a configuration example of a vehicle control system 11 which is an example of a mobile device control system according to the present embodiment.

The vehicle control system 11 is provided in a vehicle 1 and performs processing related to travel assistance and automatic driving of the vehicle 1.

The vehicle control system 11 includes a vehicle control electronic control unit (ECU) 21, a communication unit 22, a map information accumulation unit 23, a global navigation satellite system (GNSS) reception unit 24, an external recognition sensor 25, an in-vehicle sensor 26, a vehicle sensor 27, a recording unit 28, a travel assistance/automatic driving control unit 29, a driver monitoring system (DMS) 30, a human machine interface (HMI) 31, and a vehicle control unit 32.

The vehicle control ECU 21, the communication unit 22, the map information accumulation unit 23, the GNSS reception unit 24, the external recognition sensor 25, the in-vehicle sensor 26, the vehicle sensor 27, the recording unit 28, the travel assistance/automatic driving control unit 29, the DMS 30, the HMI 31, and the vehicle control unit 32 are communicably connected to each other via a communication network 41. The communication network 41 includes, for example, an in-vehicle communication network, a bus, or the like conforming to a digital bidirectional communication standard such as a controller area network (CAN), a local interconnect network (LIN), a local area network (LAN), FlexRay (registered trademark), or Ethernet (registered trademark). The communication network 41 may be selectively used depending on the type of data to be communicated. For example, CAN is applied to data related to vehicle control, and Ethernet is applied to large-capacity data. Note that each unit of the vehicle control system 11 may be directly connected not via the communication network 41 but by using wireless communication that assumes communication at a relatively short distance, such as near field communication (NFC) or Bluetooth (registered trademark).

Note that, hereinafter, in a case where each unit of the vehicle control system 11 performs communication via the communication network 41, description of the communication network 41 will be omitted. For example, in a case where the vehicle control ECU 21 and the communication unit 22 perform communication via the communication network 41, it is simply described that the processor 21 and the communication unit 22 perform communication.

The vehicle control ECU 21 includes, for example, various processors such as a central processing unit (CPU) and a micro processing unit (MPU). The vehicle control ECU 21 controls the entire or partial function of the vehicle control system 11.

The communication unit 22 communicates with various devices inside and outside the vehicle, other vehicles, servers, base stations, and the like, and transmits and receives various data. At this time, the communication unit 22 can perform communication using a plurality of communication schemes.

Communication with the outside of the vehicle executable by the communication unit 22 will be schematically described. The communication unit 22 communicates with a server (Hereinafter, the server is referred to as an external server.) or the like existing on an external network via a base station or an access point by a wireless communication method such as 5th generation mobile communication system (5G), long term evolution (LTE), or dedicated short range communications (DSRC). The external network with which the communication unit 22 performs communication is, for example, the Internet, a cloud network, a network unique to a company, or the like. The communication method by which the communication unit 22 communicates with the external network is not particularly limited as long as it is a wireless communication method capable of performing digital bidirectional communication at a communication speed higher than or equal to a predetermined speed and at a distance longer than or equal to a predetermined distance.

Furthermore, for example, the communication unit 22 can communicate with a terminal existing in the vicinity of the host vehicle using a peer to peer (P2P) technology. The terminal present in the vicinity of the host vehicle is, for example, a terminal worn by a mobile body moving at a relatively low speed such as a pedestrian or a bicycle, a terminal installed in a store or the like with a position fixed, or a machine type communication (MTC) terminal. Moreover, the communication unit 22 can also perform V2X communication. The V2X communication refers to, for example, communication between the own vehicle and another vehicle, such as vehicle to vehicle communication with another vehicle, vehicle to infrastructure communication with a roadside device or the like, vehicle to home communication, and vehicle to pedestrian communication with a terminal or the like possessed by a pedestrian.

For example, the communication unit 22 can receive a program for updating software for controlling an operation of the vehicle control system 11 from the outside (Over The Air). The communication unit 22 can further receive map information, traffic information, information around the vehicle 1, and the like from the outside. Furthermore, for example, the communication unit 22 can transmit information regarding the vehicle 1, information around the vehicle 1, and the like to the outside. Examples of the information on the vehicle 1 transmitted to the outside by the communication unit 22 include data indicating the state of the vehicle 1, a recognition result by a recognition unit 73, and the like. Furthermore, for example, the communication unit 22 performs communication corresponding to a vehicle emergency call system such as an eCall.

Communication with the inside of the vehicle executable by the communication unit 22 will be schematically described. The communication unit 22 can communicate with each device in the vehicle using, for example, wireless communication. The communication unit 22 can perform wireless communication with an in-vehicle device by a communication method capable of performing digital bidirectional communication at a predetermined communication speed or higher by wireless communication, such as wireless LAN, Bluetooth, NFC, or wireless USB (WUSB). The present invention is not limited thereto, and the communication unit 22 can also communicate with each device in the vehicle using wired communication. For example, the communication unit 22 can communicate with each device in the vehicle by wired communication via a cable connected to a connection terminal (not illustrated). The communication unit 22 can communicate with each device in the vehicle by a communication method capable of performing digital bidirectional communication at a predetermined communication speed or higher by wired communication, such as universal serial bus (USB), high-definition multimedia interface (HDMI (registered trademark)), or mobile high-definition link (MHL).

Here, the in-vehicle device refers to, for example, a device that is not connected to the communication network 41 in the vehicle. As the in-vehicle device, for example, a mobile device or a wearable device carried by a passenger such as a driver, an information device brought into the vehicle and temporarily installed, or the like is assumed.

For example, the communication unit 22 receives an electromagnetic wave transmitted by a road traffic information communication system (vehicle information and communication system (VICS (registered trademark))) such as a radio wave beacon, an optical beacon, or FM multiplex broadcasting.

The map information accumulation unit 23 accumulates one or both of a map acquired from the outside and a map created by the vehicle 1. For example, the map information accumulation unit 23 accumulates a three-dimensional high-precision map, a global map having lower accuracy than the high-precision map and covering a wide area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 1 from an external server or the like. The point cloud map is a map including point clouds (point cloud data). Here, the vector map indicates a map adapted to an advanced driver assistance system (ADAS) in which traffic information such as a lane and a signal position is associated with a point cloud map.

The point cloud map and the vector map may be provided from, for example, an external server or the like, or may be created by the vehicle 1 as a map for performing matching with a local map to be described later on the basis of a sensing result by the radar 52, the LiDAR 53, or the like, and may be accumulated in the map information accumulation unit 23. Furthermore, in a case where the high-precision map is provided from an external server or the like, for example, map data of several hundred meters square regarding a planned route on which the vehicle 1 travels from now is acquired from an external server or the like in order to reduce the communication capacity.

The GNSS reception unit 24 receives a GNSS signal from a GNSS satellite and acquires position information of the vehicle 1. The received GNSS signal is supplied to the travel assistance/automatic driving control unit 29. Note that the GNSS reception unit 24 is not limited to the method using the GNSS signal, and may acquire the position information using, for example, a beacon.

The external recognition sensor 25 includes various sensors used for recognizing a situation outside the vehicle 1, and supplies sensor data from each sensor to each unit of the vehicle control system 11. The type and number of sensors included in the external recognition sensor 25 are arbitrary.

For example, the external recognition sensor 25 includes a camera 51, a radar 52, a light detection and ranging or laser imaging detection and ranging (LiDAR) 53, and an ultrasonic sensor 54. The present invention is not limited thereto, and the external recognition sensor 25 may be configured to include one or more types of sensors among the camera 51, the radar 52, the LiDAR 53, and the ultrasonic sensor 54. The numbers of the cameras 51, the radars 52, the LiDAR 53, and the ultrasonic sensors 54 are not particularly limited as long as they can be practically installed in the vehicle 1. Furthermore, the type of sensor included in the external recognition sensor 25 is not limited to this example, and the external recognition sensor 25 may include another type of sensor. An example of a sensing region of each sensor included in the external recognition sensor 25 will be described later.

Note that an image capturing method of the camera 51 is not particularly limited as long as it is an image capturing method capable of distance measurement. For example, as the camera 51, cameras of various image capturing methods such as a time of flight (ToF) camera, a stereo camera, a monocular camera, and an infrared camera can be applied as necessary. The present invention is not limited thereto, and the camera 51 may simply acquire a captured image regardless of distance measurement.

Furthermore, for example, the external recognition sensor 25 can include an environment sensor for detecting the environment for the vehicle 1. The environment sensor is a sensor for detecting an environment such as weather, climate, and brightness, and can include various sensors such as a raindrop sensor, a fog sensor, a sunshine sensor, a snow sensor, and an illuminance sensor.

Moreover, for example, the external recognition sensor 25 includes a microphone used for detecting a sound around the vehicle 1, a position of a sound source, and the like.

The in-vehicle sensor 26 includes various sensors for detecting information inside the vehicle, and supplies sensor data from each sensor to each unit of the vehicle control system 11. The types and the number of various sensors included in the in-vehicle sensor 26 are not particularly limited as long as they can be practically installed in the vehicle 1.

For example, the in-vehicle sensor 26 can include one or more sensors of a camera, a radar, a seating sensor, a steering wheel sensor, a microphone, and a biological sensor. As the camera included in the in-vehicle sensor 26, for example, cameras of various image capturing methods capable of measuring a distance, such as a ToF camera, a stereo camera, a monocular camera, and an infrared camera, can be used. The present invention is not limited thereto, and the camera included in the in-vehicle sensor 26 may simply acquire a captured image regardless of distance measurement. The biological sensor included in the in-vehicle sensor 26 is provided in, for example, a seat, a steering wheel, or the like, and detects various types of biological information of an occupant such as a driver.

The vehicle sensor 27 includes various sensors for detecting the state of the vehicle 1, and supplies sensor data from each sensor to each unit of the vehicle control system 11. The types and the number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) integrating these sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects a rotation speed of the engine or the motor, an air pressure sensor that detects an air pressure of the tire, a slip rate sensor that detects a slip rate of the tire, and a wheel speed sensor that detects a rotation speed of the wheel. For example, the vehicle sensor 27 includes a battery sensor that detects a remaining amount and temperature of the battery, and an impact sensor that detects an external impact.

The recording unit 28 includes at least one of a nonvolatile storage medium and a volatile storage medium, and stores data and a program. The recording unit 28 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as a storage medium. The recording unit 28 records various programs and data used by each unit of the vehicle control system 11. For example, the recording unit 28 includes an event data recorder (EDR) and a data storage system for automated driving (DSSAD), and records information of the vehicle 1 before and after an event such as an accident and biological information acquired by the in-vehicle sensor 26.

The travel assistance/automatic driving control unit 29 controls travel assistance and automatic driving of the vehicle 1. For example, the travel assistance/automatic driving control unit 29 includes an analysis unit 61, an action planning unit 62, and an operation control unit 63.

The analysis unit 61 performs analysis processing of the situation of the vehicle 1 and the surroundings. The analysis unit 61 includes a self-position estimation unit 71, a sensor fusion unit 72, and the recognition unit 73.

The self-position estimation unit 71 estimates a self-position of the vehicle 1 on the basis of the sensor data from the external recognition sensor 25 and the high-precision map accumulated in the map information accumulation unit 23. For example, the self-position estimation unit 71 generates a local map on the basis of sensor data from the external recognition sensor 25, and estimates the self-position of the vehicle 1 by matching the local map with the high-precision map. A position of the vehicle 1 is based on, for example, a center of the rear wheel pair axle.

The local map is, for example, a three-dimensional high-precision map created using a technique such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 1 is divided into grids of a predetermined size, and an occupancy state of an object is indicated in units of grids. The occupancy state of the object is indicated by, for example, the presence or absence or existence probability of the object. The local map is also used for detection processing and recognition processing of a situation outside the vehicle 1 by the recognition unit 73, for example.

Note that the self-position estimation unit 71 may estimate the self-position of the vehicle 1 on the basis of the GNSS signal and the sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 executes detection processing for detecting a situation outside the vehicle 1 and recognition processing for recognizing a situation outside the vehicle 1.

For example, the recognition unit 73 performs detection processing and recognition processing of a situation outside the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The detection processing of an object is, for example, processing of detecting the presence or absence, size, shape, position, movement, and the like of the object. The recognition processing of an object is, for example, processing of recognizing an attribute such as a type of the object or identifying a specific object. However, the detection processing and the recognition processing are not necessarily clearly divided, and may overlap.

For example, the recognition unit 73 detects an object around the vehicle 1 by performing clustering to classify point clouds based on sensor data by the LiDAR 53, the radar 52, or the like into clusters of point clouds. As a result, the presence or absence, size, shape, and position of an object around the vehicle 1 are detected.

For example, the recognition unit 73 detects the motion of the object around the vehicle 1 by performing tracking that follows the motion of the clusters of the point clouds classified by clustering. As a result, a speed and a traveling direction (movement vector) of the object around the vehicle 1 are detected.

For example, the recognition unit 73 detects or recognizes a vehicle, a person, a bicycle, an obstacle, a structure, a road, a traffic light, a traffic sign, a road sign, and the like with respect to the image data supplied from the camera 51. Furthermore, the type of the object around the vehicle 1 may be recognized by performing recognition processing such as semantic segmentation.

For example, the recognition unit 73 can perform recognition processing of traffic rules around the vehicle 1 on the basis of a map accumulated in the map information accumulation unit 23, an estimation result of the self position by the self-position estimation unit 71, and a recognition result of an object around the vehicle 1 by the recognition unit 73. Through this processing, the recognition unit 73 can recognize the position and the state of the signal, the contents of the traffic sign and the road marking, the contents of the traffic regulation, the travelable lane, and the like.

For example, the recognition unit 73 can perform recognition processing of the environment around the vehicle 1. As the surrounding environment to be recognized by the recognition unit 73, weather, temperature, humidity, brightness, a state of a road surface, and the like are assumed.

The action planning unit 62 creates an action plan of the vehicle 1. For example, the action planning unit 62 creates an action plan by performing processing of global path planning and path following.

Note that the global path planning is processing of planning a rough path from the start to the goal. This path planning is called a trajectory plan, and includes processing of local path planning that enables safe and smooth traveling in the vicinity of the vehicle 1 in consideration of the motion characteristics of the vehicle 1 in the route planned by the path planning. The path planning may be distinguished from long-term path planning, and startup generation from short-term path planning, or local path planning. The safety-first path represents a concept similar to startup generation, short-term path planning, or local path planning.

The path following is processing of planning an operation for safely and accurately traveling a path planned by the path planning within a planned time. For example, the action planning unit 62 can calculate the target speed and the target angular velocity of the vehicle 1 on the basis of a result of the path following processing.

The operation control unit 63 controls the operation of the vehicle 1 in order to realize the action plan created by the action planning unit 62.

For example, the operation control unit 63 controls a steering control unit 81, a brake control unit 82, and a drive control unit 83 included in the vehicle control unit 32 to be described later, and performs acceleration/deceleration control and direction control such that the vehicle 1 travels on the trajectory calculated by the trajectory plan. For example, the operation control unit 63 performs cooperative control for the purpose of implementing the functions of the ADAS such as collision avoidance or impact mitigation, follow-up traveling, vehicle speed maintaining traveling, collision warning of the host vehicle, lane deviation warning of the host vehicle, and the like. For example, the operation control unit 63 performs cooperative control for the purpose of automatic driving or the like in which the vehicle autonomously travels without depending on the operation of the driver.

The DMS 30 performs authentication processing of a driver, recognition processing of the state of the driver, and the like on the basis of sensor data from the in-vehicle sensor 26, input data input to the HMI 31 to be described later, and the like. In this case, as the state of the driver to be recognized by the DMS 30, for example, a physical condition, a wakefulness level, a concentration level, a fatigue level, a line-of-sight direction, a drunkenness level, a driving operation, a posture, and the like are assumed.

Note that the DMS 30 may perform authentication processing of a passenger other than the driver and recognition processing of the state of the passenger. Furthermore, for example, the DMS 30 may perform recognition processing of the situation inside the vehicle on the basis of sensor data from the in-vehicle sensor 26. As the situation inside the vehicle to be recognized, for example, temperature, humidity, brightness, odor, and the like are assumed.

The HMI 31 inputs various data, instructions, and the like, and presents various data to a driver or the like.

Data input by the HMI 31 will be schematically described. The HMI 31 includes an input device for a person to input data. The HMI 31 generates an input signal on the basis of data, an instruction, or the like input by an input device, and supplies the input signal to each unit of the vehicle control system 11. The HMI 31 includes an operator such as a touch panel, a button, a switch, and a lever as an input device. The present invention is not limited thereto, and the HMI 31 may further include an input device capable of inputting information by a method other than manual operation by voice, gesture, or the like. Moreover, the HMI 31 may use, for example, a remote control device using infrared rays or radio waves, or an external connection device such as a mobile device or a wearable device corresponding to the operation of the vehicle control system 11 as an input device.

Presentation of data by the HMI 31 will be schematically described. The HMI 31 generates visual information, auditory information, and tactile information for the passenger or the outside of the vehicle. Furthermore, the HMI 31 performs output control for controlling the output, output content, output timing, output method, and the like of each piece of generated information. The HMI 31 generates and outputs, for example, an operation screen, a state display of the vehicle 1, a warning display, an image such as a monitor image indicating a situation around the vehicle 1, and information indicated by light as the visual information. Furthermore, the HMI 31 generates and outputs information indicated by sounds such as voice guidance, a warning sound, and a warning message, for example, as the auditory information. Moreover, the HMI 31 generates and outputs, as the tactile information, information given to the tactile sense of a passenger by, for example, force, vibration, motion, or the like.

As an output device that the HMI 31 outputs visual information, for example, a display device that presents visual information by displaying an image by itself or a projector device that presents visual information by projecting an image can be applied. Note that the display device may be a device that displays visual information in the field of view of the passenger, such as a head-up display, a transmissive display, or a wearable device having an augmented reality (AR) function, in addition to a display device having a normal display. Furthermore, in the HMI 31, a display device included in a navigation device, an instrument panel, a camera monitoring system (CMS), an electronic mirror, a lamp, or the like provided in the vehicle 1 can also be used as an output device that outputs visual information.

As an output device from which the HMI 31 outputs the auditory information, for example, an audio speaker, a headphone, or an earphone can be applied.

As an output device to which the HMI 31 outputs tactile information, for example, a haptic element using a haptic technology can be applied. The haptics element is provided, for example, at a portion with which a passenger of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls the state of a steering system of the vehicle 1. The steering system includes, for example, a steering mechanism including a steering wheel and the like, an electric power steering, and the like. The steering control unit 81 includes, for example, a control unit such as an ECU that controls the steering system, an actuator that drives the steering system, and the like.

The brake control unit 82 detects and controls the state of a brake system of the vehicle 1. The brake system includes, for example, a brake mechanism including a brake pedal, an antilock brake system (ABS), a regenerative brake mechanism, and the like. The brake control unit 82 includes, for example, a control unit such as an ECU that controls the brake system.

The drive control unit 83 detects and controls the state of a drive system of the vehicle 1. The drive system includes, for example, a driving force generation device for generating a driving force such as an accelerator pedal, an internal combustion engine, or a driving motor, a driving force transmission mechanism for transmitting the driving force to wheels, and the like. The drive control unit 83 includes, for example, a control unit such as an ECU that controls the drive system.

The body system control unit 84 detects and controls the state of a body system of the vehicle 1. The body system includes, for example, a keyless entry system, a smart key system, a power window device, a power seat, an air conditioner, an airbag, a seat belt, a shift lever, and the like. The body system control unit 84 includes, for example, a control unit such as an ECU that controls the body system.

The light control unit 85 detects and controls states of various lights of the vehicle 1. As the light to be controlled, for example, a headlight, a backlight, a fog light, a turn signal, a brake light, a projection, a display of a bumper, and the like are assumed. The light control unit 85 includes a control unit such as an ECU that performs light control.

The horn control unit 86 detects and controls the state of a car horn of the vehicle 1. The horn control unit 86 includes, for example, a control unit such as an ECU that controls the car horn.

Figure 2:
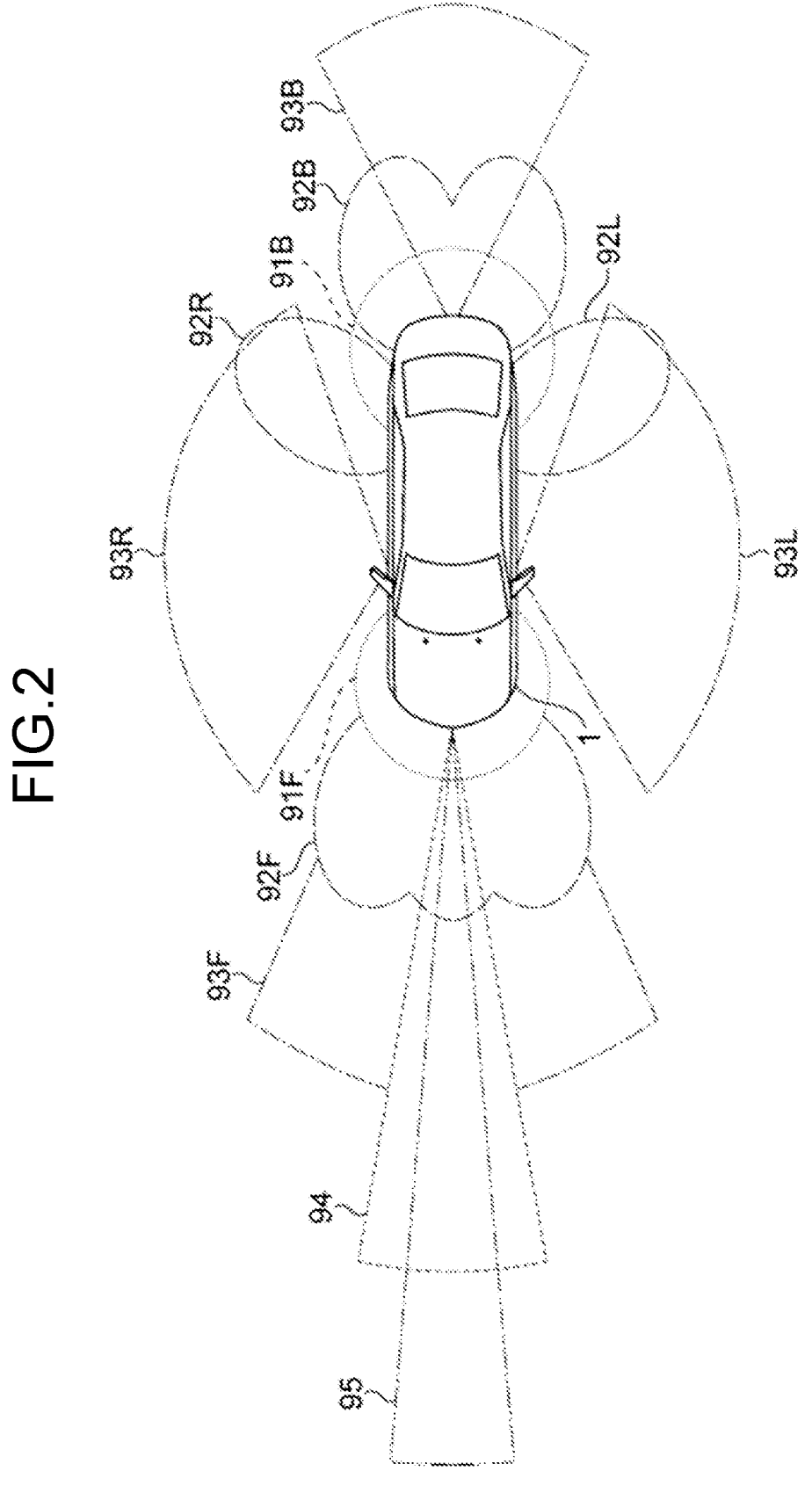
FIG. 2 is a diagram illustrating an example of a sensing region.

FIG. 2 is a diagram illustrating an example of a sensing region by the camera 51, the radar 52, the LiDAR 53, the ultrasonic sensor 54, and the like of the external recognition sensor 25 in FIG. 1. Note that FIG. 2 schematically illustrates the vehicle 1 as viewed from above, where the left end side is the front end (front) side of the vehicle 1 and the right end side is the rear end (rear) side of the vehicle 1.

A sensing region 91F and a sensing region 91B illustrate examples of the sensing region of the ultrasonic sensor 54. The sensing region 91F covers the periphery of the front end of the vehicle 1 by a plurality of the ultrasonic sensors 54. The sensing region 91B covers the periphery of the rear end of the vehicle 1 by the plurality of ultrasonic sensors 54.

The sensing results in the sensing region 91F and the sensing region 91B are used, for example, for parking assistance of the vehicle 1.

Sensing regions 92F to 92B illustrate examples of sensing regions of the radar 52 for a short distance or a middle distance. The sensing region 92F covers a position farther than the sensing region 91F in front of the vehicle 1. The sensing region 92B covers a position farther than the sensing region 91B behind the vehicle 1. The sensing region 92L covers the rear periphery of the left side surface of the vehicle 1. The sensing region 92R covers the rear periphery of the right side surface of the vehicle 1.

The sensing result in the sensing region 92F is used, for example, to detect a vehicle, a pedestrian, or the like existing in front of the vehicle 1. The sensing result in the sensing region 92B is used, for example, for a collision prevention function or the like behind the vehicle 1. The sensing results in the sensing region 92L and the sensing region 92R are used, for example, for detecting an object in a blind spot on the side of the vehicle 1.

Sensing regions 93F to 93B illustrate examples of sensing regions by the camera 51. The sensing region 93F covers a position farther than the sensing region 92F in front of the vehicle 1. The sensing region 93B covers a position farther than the sensing region 92B behind the vehicle 1. The sensing region 93L covers the periphery of the left side surface of the vehicle 1. The sensing region 93R covers the periphery of the right side surface of the vehicle 1.

The sensing result in the sensing region 93F can be used for, for example, recognition of a traffic light or a traffic sign, a lane departure prevention assist system, and an automatic headlight control system. The sensing result in the sensing region 93B can be used for, for example, parking assistance and a surround view system. The sensing results in the sensing region 93L and the sensing region 93R can be used for a surround view system, for example.

A sensing region 94 shows an example of the sensing region of the LiDAR 53. The sensing region 94 covers a position farther than the sensing region 93F in front of the vehicle 1. On the other hand, the sensing region 94 has a narrower range in a left-right direction than the sensing region 93F.

The sensing result in the sensing region 94 is used, for example, for detecting an object such as a surrounding vehicle.

A sensing region 95 illustrates an example of the sensing region of the long-range radar 52.

The sensing region 95 covers a position farther than the sensing region 94 in front of the vehicle 1. On the other hand, the sensing region 95 has a narrower range in the left-right direction than the sensing region 94.

The sensing result in the sensing region 95 is used for, for example, adaptive cruise control (ACC), emergency braking, collision avoidance, and the like.

Note that the sensing regions of the sensors of the camera 51, the radar 52, the LiDAR 53, and the ultrasonic sensor 54 included in the external recognition sensor 25 may have various configurations other than those in FIG. 2. Specifically, the ultrasonic sensor 54 may also sense the side of the vehicle 1, or the LiDAR 53 may sense the rear of the vehicle 1. Furthermore, the installation position of each sensor is not limited to each example described above. Furthermore, the number of sensors may be one or more.

1.2 Configuration Example of Solid-State Imaging Device (Image Sensor)

Figure 3:
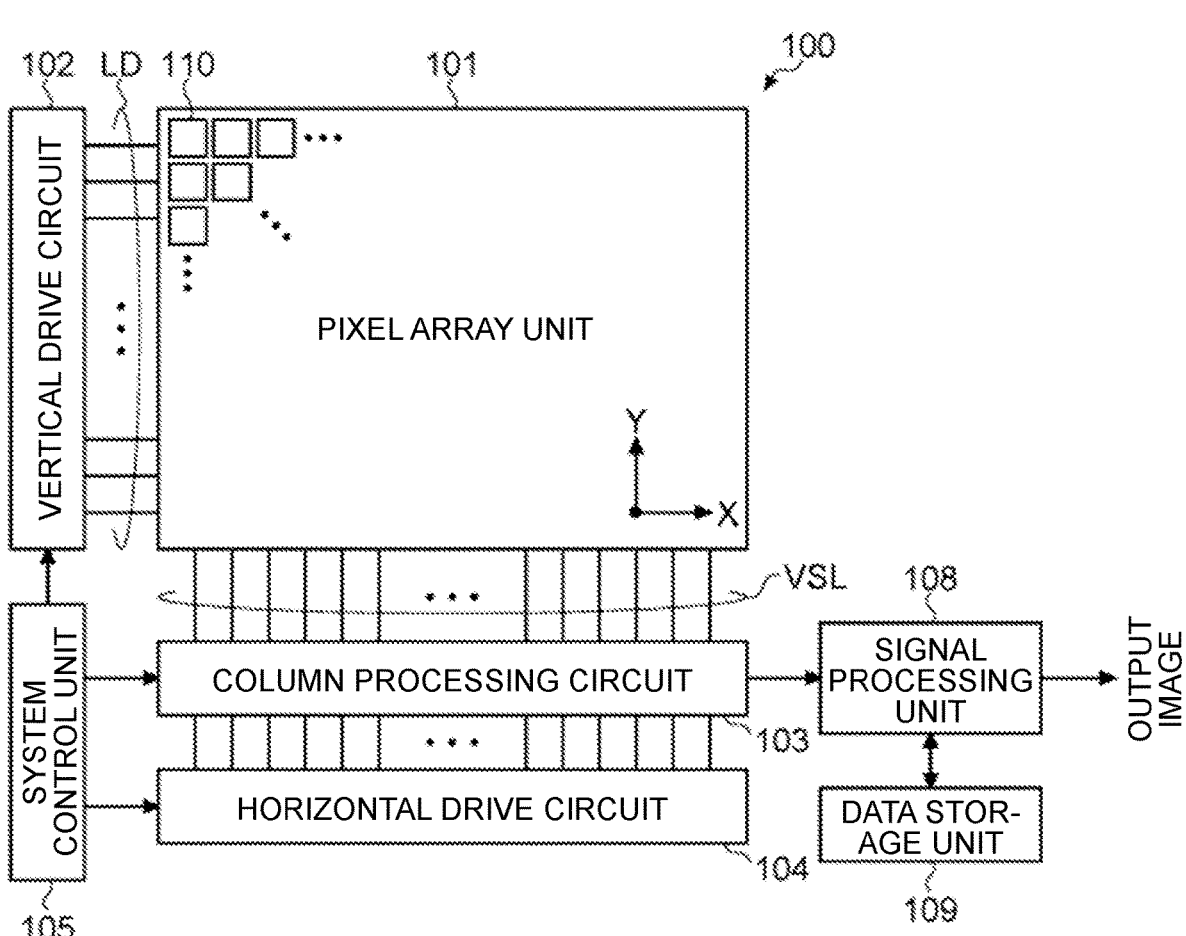
FIG. 3 is a block diagram illustrating a schematic configuration example of an image sensor according to an embodiment.

Next, a configuration example of a solid-state imaging device (Hereinafter, referred to as an image sensor.) constituting the camera 51 included in the external recognition sensor 25 will be described. FIG. 3 is a block diagram illustrating a schematic configuration example of an image sensor according to the present embodiment. Here, the image sensor may be, for example, an image sensor created by applying or partially using a CMOS process.

An image sensor 100 according to the present embodiment has, for example, a stack structure in which a semiconductor chip on which a pixel array unit 101 is formed and a semiconductor chip on which a peripheral circuit is formed are stacked. The peripheral circuit may include, for example, a vertical drive circuit 102, a column processing circuit 103, a horizontal drive circuit 104, and a system control unit 105.

The image sensor 100 further includes a signal processing unit 108 and a data storage unit 109. The signal processing unit 108 and the data storage unit 109 may be provided on the same semiconductor chip as the peripheral circuit, or may be provided on another semiconductor chip.

The pixel array unit 101 has a configuration in which pixels 110 each having a photoelectric conversion element that generates and accumulates a charge according to an amount of received light are arranged in a row direction and a column direction, that is, in a two-dimensional lattice shape in a matrix. Here, the row direction refers to an arrangement direction of pixels in a pixel row (lateral direction in the drawing), and the column direction refers to an arrangement direction of pixels in a pixel column (longitudinal direction in the drawing).

In the pixel array unit 101, a pixel drive line LD is wired along the row direction for each pixel row, and a vertical signal line VSL is wired along the column direction for each pixel column with respect to the matrix-like pixel array. The pixel drive line LD transmits a drive signal for driving when a signal is read from the pixel. In FIG. 3, the pixel drive lines LD are illustrated as wiring lines one by one, but are not limited to wiring lines one by one. One end of the pixel drive line LD is connected to an output terminal corresponding to each row of the vertical drive circuit 102.

The vertical drive circuit 102 includes a shift register, an address decoder, and the like, and drives each pixel of the pixel array unit 101 at the same time for all pixels or in units of rows. That is, the vertical drive circuit 102 constitutes a drive unit that controls the operation of each pixel of the pixel array unit 101 together with the system control unit 105 that controls the vertical drive circuit 102. Although a specific configuration of the vertical drive circuit 102 is not illustrated, the vertical drive circuit generally includes two scanning systems of a readout scanning system and a sweep scanning system.

The readout scanning system sequentially selects and scans the pixels 110 of the pixel array unit 101 row by row in order to read out signals from the pixels. The signals read from the pixels 110 are analog signals. The sweep scanning system performs sweep scanning on a read row on which readout scanning is performed by the readout scanning system prior to the readout scanning by an exposure time.

By the sweep scanning by the sweep scanning system, unnecessary charges are swept out from the photoelectric conversion elements of the pixels 110 in the read row, whereby the photoelectric conversion elements are reset. Then, by sweeping out (resetting) unnecessary charges in the sweep scanning system, a so-called electronic shutter operation is performed. Here, the electronic shutter operation refers to an operation of discarding charges of the photoelectric conversion element and newly starting exposure (starting accumulation of charges).

The signal read by the readout operation by the readout scanning system corresponds to the amount of light received after the immediately preceding readout operation or electronic shutter operation. Then, a period from the readout timing by the immediately preceding readout operation or the sweep timing by the electronic shutter operation to the readout timing by the current readout operation is a charge accumulation period (also referred to as an exposure period) in the pixel 110.

A signal output from each pixel 110 of the pixel row selectively scanned by the vertical drive circuit 102 is input to the column processing circuit 103 through each of the vertical signal lines VSL for each pixel column. The column processing circuit 103 performs predetermined signal processing on the signal output from each pixel of the selected row through the vertical signal line VSL for each pixel column of the pixel array unit 101, and temporarily holds the pixel signal after the signal processing.

Specifically, the column processing circuit 103 performs at least noise removal processing, for example, correlated double sampling (CDS) processing or double data sampling (DDS) processing, as signal processing. For example, the fixed pattern noise unique to the pixel such as the reset noise and the threshold variation of an amplification transistor in the pixel is removed by the CDS processing. The column processing circuit 103 also has, for example, an analog-digital (AD) conversion function, converts an analog pixel signal read from the photoelectric conversion element into a digital signal, and outputs the digital signal.

The horizontal drive circuit 104 includes a shift register, an address decoder, and the like, and sequentially selects a readout circuit (Hereinafter, referred to as a pixel circuit.) corresponding to a pixel column of the column processing circuit 103. By the selective scanning by the horizontal drive circuit 104, pixel signals subjected to signal processing for each pixel circuit in the column processing circuit 103 are sequentially output.

The system control unit 105 includes a timing generator that generates various timing signals and the like, and performs drive control of the vertical drive circuit 102, the column processing circuit 103, the horizontal drive circuit 104, and the like on the basis of various timings generated by the timing generator.

The signal processing unit 108 has at least an arithmetic processing function, and performs various signal processing such as arithmetic processing on the pixel signal output from the column processing circuit 103. The data storage unit 109 temporarily stores data necessary for signal processing in the signal processing unit 108.

Note that the image data output from the signal processing unit 108 may be subjected to predetermined processing in the travel assistance/automatic driving control unit 29 or the like in the vehicle control system 11 equipped with the image sensor 100, or may be transmitted to the outside via the communication unit 22, for example.

1.3 Basic Operation Example (Generation of Frame Data by 4-Cycle Sequence and DOL Synthesis)

Figure 4:
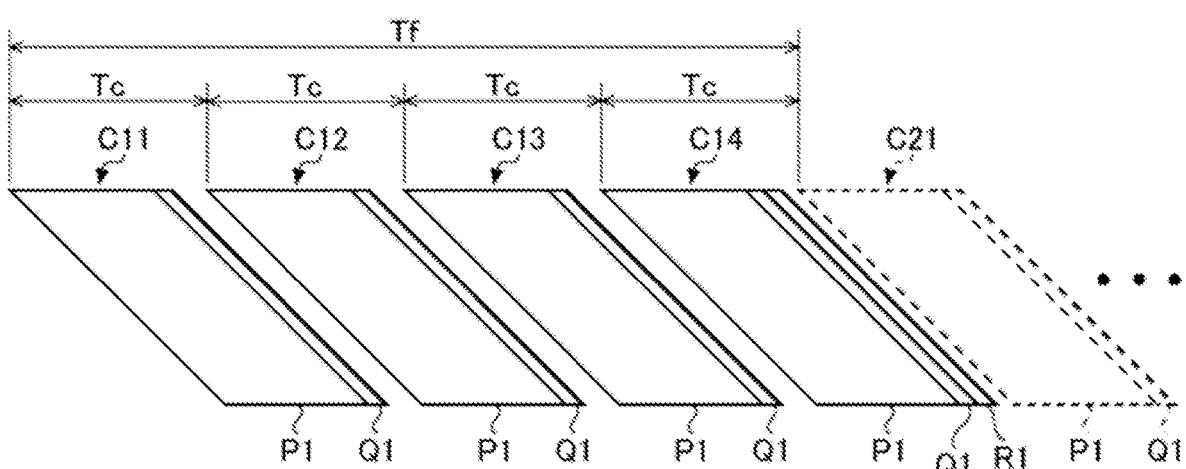
FIG. 4 is a diagram for explaining an example of a readout operation executed by the image sensor in one frame period according to an embodiment.
Figure 5:
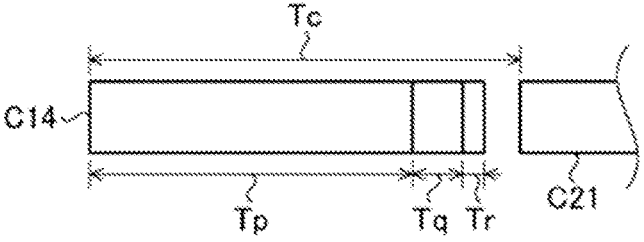
FIG. 5 is a diagram for explaining an example of a readout operation executed by the image sensor in one cycle period according to an embodiment.

Next, a basic operation example of the image sensor 100 according to the present embodiment will be described. FIG. 4 is a diagram for describing an example of a readout operation executed by the image sensor in one frame period according to the present embodiment, and FIG. 5 is a diagram for describing an example of a readout operation executed by the image sensor in one cycle period according to the present embodiment. Note that, in the following description, the operation of reading image data (cycle data or the like) from the pixel array unit 101, including the readout operation illustrated in FIG. 4, is executed by operating the vertical drive circuit 102, the column processing circuit 103, and the horizontal drive circuit 104, for example, in accordance with an instruction from the system control unit 105 in FIG. 3. Therefore, in the present description, these are also collectively referred to as a control unit.

As illustrated in FIG. 4, in the present embodiment, a period (hereinafter, referred to as a frame period) Tf for outputting one piece of image data (hereinafter, referred to as frame data) is divided into a plurality of cycles (In this example, four cycles C11 to C14 are used.). In the present embodiment, each period obtained by dividing one frame period Tf into four equal periods is set as one cycle period Tc. In each cycle period Tc, for example, image data (hereinafter, referred to as cycle data) having the same size as the frame data may be read by an operation similar to a normal readout operation of reading frame data.

As illustrated in FIG. 5, each cycle period Tc includes an accumulation exposure period Tp for outputting image data based on a charge generated by photoelectric conversion by a photoelectric conversion element of each pixel 110, and a non-accumulation exposure period Tq for outputting non-exposed image data not based on a charge generated by photoelectric conversion. Note that, although the cycle C14 is illustrated in FIG. 5, the other cycles C11 to C13 may have the same configuration.

The non-accumulation exposure period Tq may be, for example, a period shorter than the accumulation exposure period Tp (for example, a period of $\frac{1}{16}$). As a specific example, for example, in a case where a frame rate of the image sensor 100 is 60 fps, one frame period can be 16.67 ms (milliseconds), one cycle period Tc can be 4.167 ms, an accumulation exposure period Tp can be 3.9 ms, and a non-accumulation exposure period Tq can be 0.24 ms. However, these are merely examples, and are not limited to these numerical values.

Image data Q1 output in the non-accumulation exposure period Tq can be used to remove noise components such as noise and fixed pattern noise caused by dark current from image data P1 output in the accumulation exposure period Tp. That is, the image data P1 output in the accumulation exposure period Tp may include a signal component based on electric charges generated by photoelectric conversion and a noise component caused by dark current or the like.

Therefore, image data (cycle data) of a signal component with high purity can be generated by subtracting the image data Q1 which is a noise component from the image data P1. At that time, in order to equalize the noise levels of the image data P1 and the image data Q1, the pixel value of the image data Q1 may be amplified, for example, on the basis of the respective exposure periods. In this example, for example, the pixel value of the image data Q1 may be multiplied by Tp/Tq. Such noise component removal may be executed, for example, in the column processing circuit 103 in FIG. 3 or may be executed in the signal processing unit 108.

Furthermore, as illustrated in FIGS. 4 and 5, at least one (in this example, cycle C14) of the plurality of cycle periods Tc obtained by dividing one frame period Tf may include an ultra-high luminance accumulation exposure period Tr. For example, in a case where the charge of the pixel 110 (specifically, a charge storage unit such as a floating diffusion region in the pixel 110) is saturated by exposing the pixel 110 with illuminance higher than expected during the accumulation exposure period Tp, for the cycle data or the frame data including the saturated pixel 110 or the saturated pixel, the frame data may be generated using the image data generated during the ultra-high luminance accumulation exposure period Tr instead of the image data P1 generated during the accumulation exposure period Tp. The ultra-high luminance accumulation exposure period Tr may be, for example, a period shorter than the non-accumulation exposure period Tq. For example, the ultra-high luminance accumulation exposure period Tr may be a period on the order of microseconds. Furthermore, the noise component of image data R1 generated in the ultra-high luminance accumulation exposure period Tr may be removed using the image data Q1 generated in the non-accumulation exposure period Tq. However, in a case where the ultra-high luminance accumulation exposure period Tr is short enough to ignore the noise component, the noise component of the image data R1 may not be removed.

Figure 6:
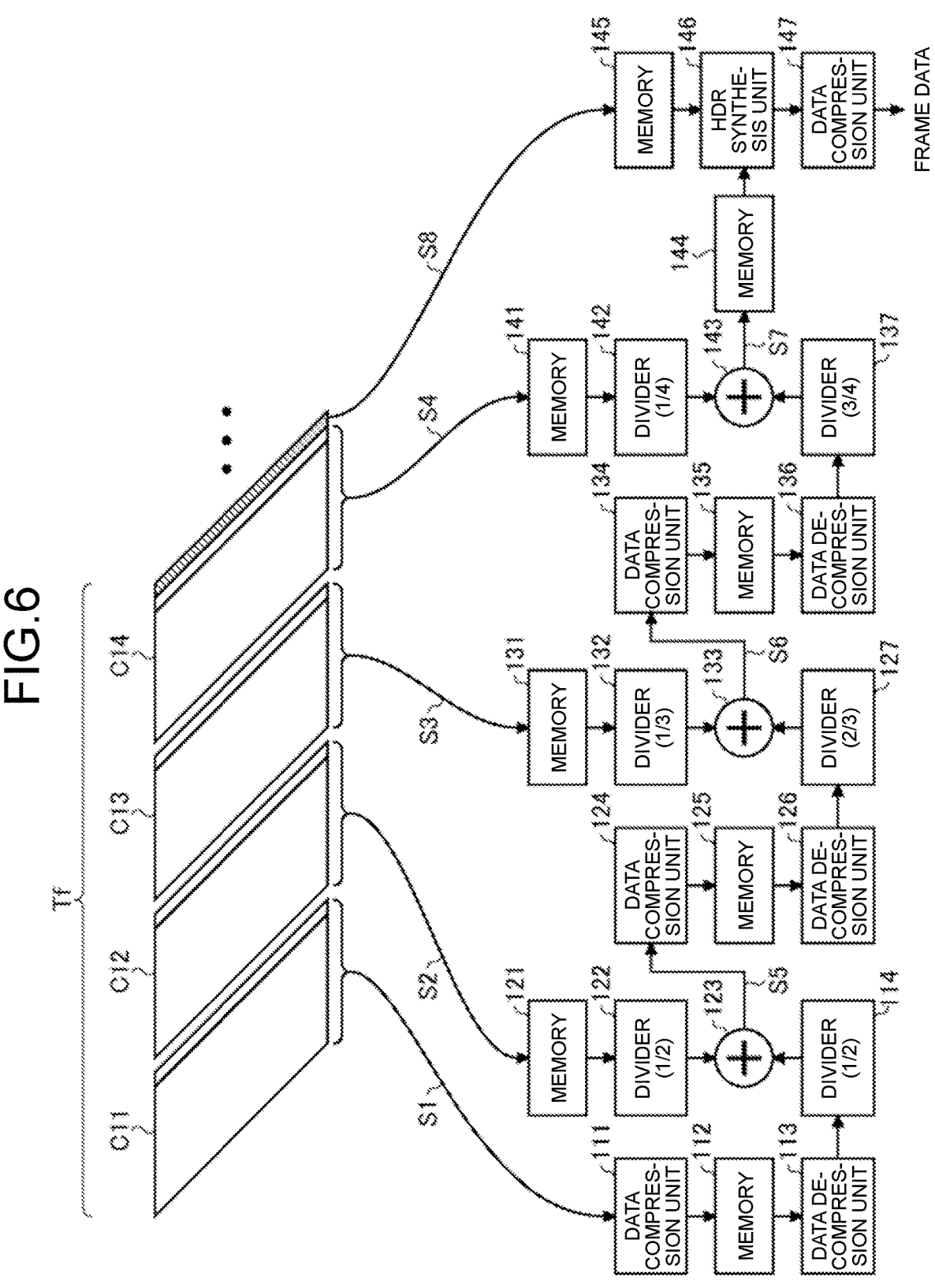
FIG. 6 is a diagram for explaining a configuration example and an operation example of a frame data generation unit in the image sensor according to an embodiment.

Next, an operation when generating one frame data from the cycle data read in each of the cycles C11 to C14 will be described. In the present description, a case where frame data is generated using digital overlap (DOL) synthesis is exemplified, but the present invention is not limited thereto, and various methods may be used. FIG. 6 is a diagram for describing a configuration example and an operation example of a frame data generation unit in the image sensor according to the present embodiment. Note that this generation unit may be realized, for example, in the column processing circuit 103 or the signal processing unit 108 in FIG. 3.

As illustrated in FIG. 6, the frame data generation unit according to the present embodiment may be implemented as, for example, an averaging circuit. Cycle data S1 read in the first cycle C11 in the one frame period Tf is input to a data compression unit 111 in the generation unit. The data compression unit 111 and data compression units 124 and 134 to be described later may reduce a data amount of the cycle data using, for example, a data compression method such as Piecewise Linear (PWL) in which the number of bits is reduced by making the high-order bits sparse. However, the data compression method adopted in these data compression units is not limited to the PWL, and may be various lossless compression methods or lossy compression methods capable of reducing the data amount of cycle data. Furthermore, in a case where the PWL is adopted, a method using a lookup table (LUT) for data compression may be adopted, or a method not using the LUT may be adopted.

The cycle data S1 compressed by the data compression unit 111 is temporarily stored in a memory 112. The memory 112 and memories 121, 125, 131, 135, 141, 144, and 145 to be described later are, for example, memories arranged at boundaries where operations occur between cycles, and can be realized by, for example, the data storage unit 109 in FIG. 3. At that time, in a case where the registration between the cycle data to be added is completed in advance, that is, in a case where the motion vector search (ME) for each cycle data to be added is completed in advance, and the registration between the cycle data is completed in advance on the basis of the motion amount of the image estimated by this search, it is possible to directly add the cycle data to each other, so that the capacity of each memory can be reduced. Furthermore, as will be described later, by setting an addition ratio of each cycle data in advance, the capacity of each memory can be reduced.

The cycle data S1 temporarily stored in the memory 112 is decompressed by a data decompression unit 113 and then input to a divider 114 that divides the cycle data S1 based on a preset addition ratio. Note that a data decompression method corresponding to the data compression method adopted in the data compression units 111, 124, and 134 may be adopted for the data decompression unit 113 and data decompression units 126 and 136 to be described later. Furthermore, for example, a bit shift computing unit that divides a value by shifting bits may be adopted as the divider 114 and a divider 122 to be described later. At that time, the lower bit (for example, lower 4 bits) may be excluded from the division target bit in order to suppress a decrease in accuracy of a pixel having low luminance. In this example, the divider 114 divides the cycle data S1 by a preset addition ratio (=1/2). The cycle data S1 divided by the divider 114 is input to an adder 123.

Furthermore, cycle data S2 read in the next cycle C12 is also input to the adder 123. Specifically, the cycle data S2 read in the next cycle C12 is temporarily stored in the memory 121 and then input to the divider 122 to be divided on the basis of a preset addition ratio (=1/2), and then input to the adder 123. The cycle data S1 and S2 divided based on the addition ratio (=1/2) are added (DOL synthesis) by the adder 123. Synthesis cycle data S5 generated by this addition is subjected to data compression by the data compression unit 124 and then temporarily stored in the memory 125. Note that the addition ratios set to the dividers 114 and 122 may be set so that, for example, the sum is '1' and the component ratio of each of the cycle data S1 and S2 is 1:1 in the synthesis cycle data S5.

The synthesis cycle data S5 temporarily stored in the memory 125 is subjected to data decompression by the data decompression unit 126 and then input to a divider 127. The divider 127 divides the cycle data S5 by a preset addition ratio (=2/3) and inputs the divided synthesis cycle data S5 to an adder 133.

Furthermore, cycle data S3 read in the next cycle C13 is also input to the adder 133. Specifically, the cycle data S3 read in the next cycle C13 is temporarily stored in the memory 131 and then input to a divider 132 to be divided on the basis of a preset addition ratio (=1/3), and then input to the adder 133. Note that a bit calculator may be adopted for the divider 132 and dividers 137 and 142 to be described later. The synthesis cycle data S5 and the cycle data S3 divided based on the addition ratios (=2/3, 1/3) are added (DOL-synthesized) by the adder 133. Synthesis cycle data S6 generated by this addition is subjected to data compression by the data compression unit 134 and then temporarily stored in the memory 135. Note that the addition ratios set to the dividers 127 and 132 may be set so that, for example, the sum is '1' and the component ratios of the cycle data S1, S2, and S3 are 1:1:1 in the synthesis cycle data S6.

The synthesis cycle data S6 temporarily stored in the memory 135 is subjected to data decompression by the data decompression unit 136 and then input to the divider 137. The divider 137 divides the cycle data S6 by a preset addition ratio (=3/4) and inputs the divided synthesis cycle data S6 to an adder 143.

Furthermore, cycle data S4 read in the next cycle C14 is also input to the adder 143. Specifically, the cycle data S4 read in the next cycle C14 is temporarily stored in the memory 141 and then input to the divider 142 to be divided on the basis of a preset addition ratio (=1/4), and then input to the adder 143. The synthesis cycle data S6 and the cycle data S4 divided based on the addition ratios (=3/4, 1/4) are added (DOL-synthesized) by the adder 143. Synthesis cycle data S7 generated by this addition is temporarily stored in the memory 144. Note that the addition ratios set to the dividers 137 and 142 may be set so that, for example, the sum is '1' and the component ratios of the cycle data S1, S2, S3, and S4 are 1:1:1:1 in the synthesis cycle data S7.

The synthesis cycle data S7 temporarily stored in the memory 144 is input to a high dynamic range (HDR) synthesis unit 146. Furthermore, image data S8 read in the ultra-high luminance accumulation exposure period Tr is also input to the HDR synthesis unit 146. For example, in a case where there is a pixel whose value is saturated in the synthesis cycle data S7, the HDR synthesis unit 146 executes HDR synthesis by replacing the pixel value of this pixel with a pixel value of the corresponding pixel in the image data S8.

The image data output from the HDR synthesis unit 146 is subjected to data compression by a data compression unit 147, and then output to the outside as frame data. Note that the data compression method adopted in the data compression unit 147 is not limited to the PWL, and may be various data compression methods.

As described above, in the present embodiment, one frame period Tf is divided into the plurality of cycle periods Tc, and the cycle data S1 to S4 are read in each of the cycle periods Tc. As a result, the exposure time (accumulation exposure period Tp) at the time of reading each of the cycle data S1 to S4 is shortened, so that blur of each of the cycle data S1 to S4 can be reduced. Then, since the frame data is generated by adding (DOL synthesis) the cycle data S1 to S4 in which the blur is reduced, the blur of the finally output frame data can also be reduced. Accordingly, it is possible to generate frame data in which blur is suppressed to such an extent that blur does not affect image recognition.

Furthermore, in the present embodiment, since the image data (cycle data) is read in a cycle faster than the frame rate, it is also possible to detect a flicker light source flickering at a predetermined cycle such as a light emitting diode (LED), for example. As a result, it is possible to simultaneously achieve generation of an image that is not affected by flicker of the flicker light source and detection of the flicker light source.

Moreover, in the present embodiment, the image data Q1 including the noise component is acquired, and the noise component is removed from the image data P1 including the signal component and the noise component using the image data Q1. As a result, even in a situation where the SN deteriorates due to heat generation of the sensor chip itself, it is possible to generate image data (cycle data and frame data) having a higher purity of signal components, and thus, it is possible to generate image data with higher image quality by suppressing occurrence of SNR drop.

Moreover, as in the present embodiment, by dividing the accumulation exposure period in one frame period Tf into the plurality of cycles, it is possible to suppress substantial shortening of the accumulation exposure time when one frame data is generated. Therefore, it is possible to generate frame data with reduced blur while suppressing deterioration in visibility of an image acquired in a low-illuminance environment.

Moreover, as in the present embodiment, by dividing the accumulation exposure period in one frame period Tf into the plurality of cycles, the amount of charge accumulated in one frame can be dispersed into the plurality of cycles, so that it is possible to expand a substantial dynamic range when generating one frame data.

Moreover, as in the present embodiment, when the cycle data is added (DOL-synthesized), a motion vector for each cycle data to be added is searched in advance, and alignment between the cycle data is completed in advance on the basis of the motion amount of the image estimated by the search, whereby the capacity of each memory can be reduced.

Moreover, in general, as a factor that causes blur in the image data, the influence of the global motion due to the movement of the position and posture of the image sensor 100 is overwhelmingly larger than the influence of the local motion due to the movement of the individual subject. Therefore, as in the present embodiment, when the cycle data is added (DOL-synthesized), a motion vector for each cycle data to be added is searched in advance, and alignment between the cycle data is completed in advance on the basis of the motion amount of the image estimated by this search, so that it is possible to accurately suppress the influence of the global motion that can be caused by adding the cycle data. This makes it possible to generate clear image data with suppressed blur.

Note that, in the present description, the case where one frame period Tf is equally divided to set the plurality of cycles C11 to C14 has been exemplified, but the present invention is not limited thereto, and the time length of at least one cycle period Tc among the plurality of cycles C11 to C14 may be different from the time length of the cycle period Tc of other cycles. Similarly, in the present description, the case where the time length of the accumulation exposure period Tp and the time length of the non-accumulation exposure period Tq are the same in each of the cycles C11 to C14 has been exemplified, but the present invention is not limited thereto, and the time length of the accumulation exposure period Tp and/or the time length of the non-accumulation exposure period Tq in at least one cycle may be different from that in other cycles or those in other cycles.

Furthermore, in the present embodiment, the change of one frame period Tf, in other words, the change of the frame rate may be realized, for example, by adjusting the length of a blanking period at the end of each frame period Tf. In this way, it is not necessary to change the operation of the image sensor 100 in each of the cycles C11 to C14, so that the frame rate can be changed by a simpler method.

1.4 Another Countermeasure Example of SNR Drop

Figure 7:
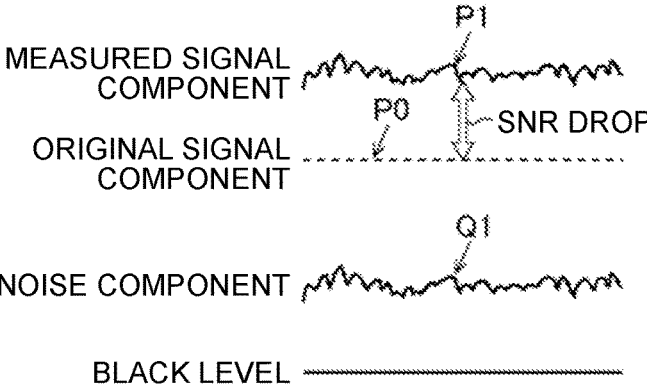
FIG. 7 is a diagram for explaining a generation principle of an SNR drop.

In the basic operation example described above, the case where the image data Q1 including the noise component is acquired, and the noise component is removed from the image data P1 including the signal component and the noise component using the image data Q1, so that the purity of the signal component is increased to suppress the occurrence of the SNR drop has been exemplified. However, the measure against the SNR drop is not limited thereto. Therefore, first, a generation principle of the SNR drop will be described. FIG. 7 is a diagram for describing a generation principle of an SNR drop.

As illustrated in FIG. 7, in the non-accumulation exposure period Tq of each cycle period Tc, the image data Q1 including a noise component is read. The noise component is also included in the image data P1 read out in the accumulation exposure period Tp so as to be superimposed on the actual signal component P0.

Main elements of the noise component are noise caused by dark current, fixed pattern noise, and the like. Among them, the fixed pattern noise is a qualitative noise component determined in a design stage or a manufacturing stage of the image sensor 100. Furthermore, the noise caused by the dark current or the like is a qualitative noise component for each temperature correlated with a chip temperature of the image sensor 100. Therefore, a noise component (that is, the image data Q1) whose main component is noise caused by fixed pattern noise, dark current, or the like can be acquired before shipment of the image sensor 100.

Therefore, in the present embodiment, the image data Q1 at the time of non-exposure may be acquired in advance for each predetermined temperature zone at a predetermined timing before and/or after shipment of the image sensor 100, and the acquired image data Q1 for each temperature zone may be stored in the data storage unit 109, the memory in the column processing circuit 103, or the like. Note that the non-exposure time may be a state in which the image sensor 100 is arranged in a dark portion or a state in which charges generated by photoelectric conversion of the pixel 110 are discarded. Then, at the time of reading the cycle data S1 to S4, reading of the image data Q1 stored in the data storage unit 109 or the like may be executed instead of reading of the image data Q1. At this time, the image data Q1 read from the data storage unit 109 or the like may be selected on the basis of a temperature detected by a temperature sensor (not illustrated). Such measures against the SNR drop may be executed, for example, in the column processing circuit 103 in FIG. 3 or may be executed in the signal processing unit 108.

As described above, by acquiring the image data Q1 as a noise component in advance, it is possible to omit the operation of reading the image data Q1 during each cycle period Tc, and thus, it is possible to simplify the operation when generating frame data, reduce power consumption, and the like.

1.5 Detection and Removal of Flicker

As exemplified above with reference to FIG. 6, in a case where a period obtained by dividing one frame period Tf into, for example, four equal periods is a cycle period Tc, there is a case where flicker of the flicker light source cannot be detected due to the relationship between the frame rate and the flickering cycle of the flicker light source. For example, in a case where the cycle frequency of the image sensor 100 is about 240 Hz (Hertz), the flicker light source in the vicinity of 120 Hz is detected as a subject that is continuously turned on or off or slowly repeats flickering. This suggests that it may be difficult to detect a flicker light source that operates at a general power frequency, for example, a traffic light using an LED.

Therefore, in the present embodiment, a function for determining that it is a flicker light source is implemented while implementing an LED flicker mitigation (LFM) for displaying the flicker light source without flickering.

Figure 8:
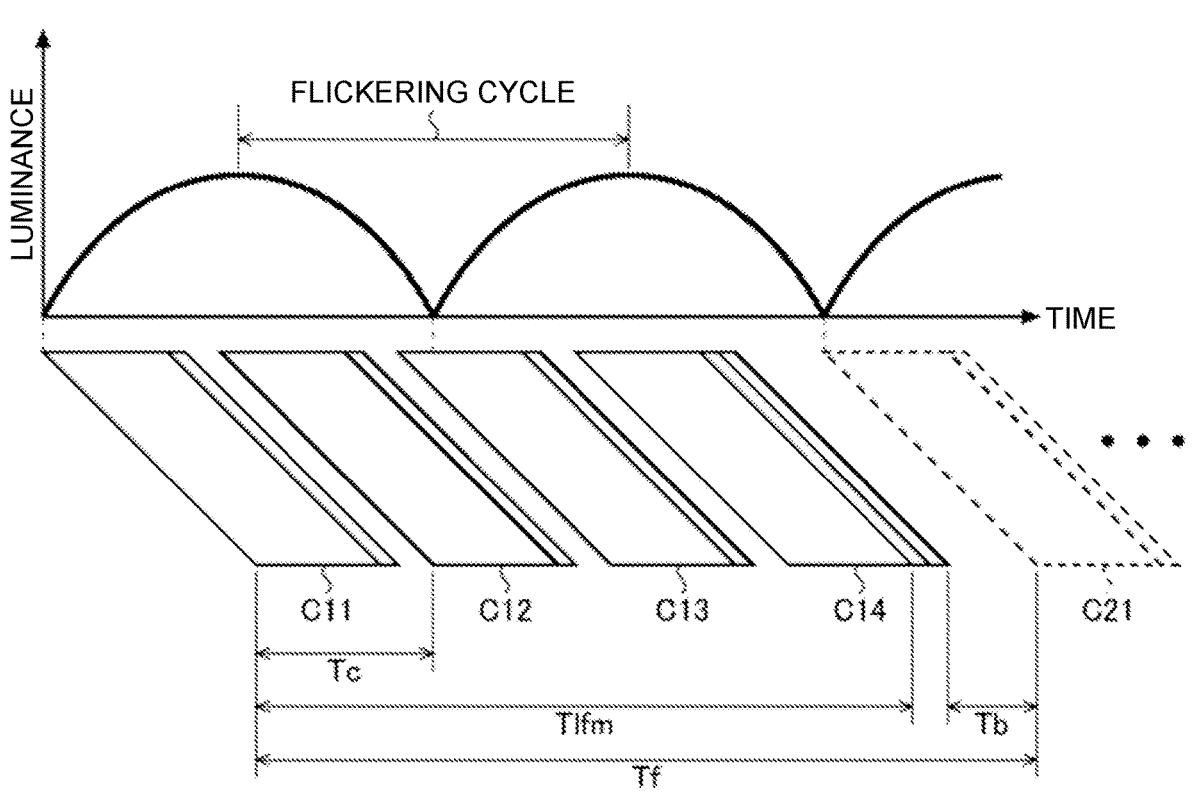
FIG. 8 is a diagram for explaining another example of the readout operation executed by the image sensor in one frame period according to an embodiment.

Specifically, in the present embodiment, for example, as illustrated in FIG. 8, the cycle frequency is set to a frequency different from the power of 2 of the frame frequency. For example, in a case where the frame frequency is 60 Hz (that is, in a case where the frame rate is 60 fps,), if a period obtained by dividing the frame period into four is set as a cycle period, the cycle frequency becomes 240 Hz that is a square multiple of 2 of 60 Hz, and it becomes difficult to detect a flicker light source near 120 Hz. Therefore, in the present embodiment, for example, the cycle frequency is set to 300 Hz different from the power of 2 of 60 Hz. As a result, the cycle period of the image sensor 100 can be shifted from the flickering cycle of the flicker light source, so that the flicker light source can be detected.

Note that, in the present embodiment, since the number of cycles (in this example, four) in one frame period Tf may be fixed, when one frame period Tf is not equally divided by the number of cycles, a surplus period may occur. In that case, as illustrated in FIG. 8, the remaining period may be a blanking period Tb in which exposure is not performed.

At that time, the one cycle period Tc and the blanking period Tb are preferably set such that the sum of the accumulation exposure periods Tp in the one frame period Tf is 50% or more (that is, a duty ratio is 50% or more.) of the frame period Tf. As a result, it is possible to suppress deterioration in image visibility due to insufficient exposure. For example, in a case where the one frame period Tf is 16.67 ms (corresponding to 60 Hz) and the one cycle period Tc is 3.3 ms (corresponding to about 300 Hz), the period (Hereinafter, the LFM period is referred to as an LFM period Tlfm.) from the exposure start of the first cycle C11 to the exposure end of the last cycle C14 in one frame may be set to 11 ms or more and 16.67 ms or less in consideration of the non-accumulation exposure period Tq in each cycle and the blanking period between each cycle.

In a case where the cycle period Tc is set for each frame period Tf according to the rule as described above, it is possible to generate frame data in which flicker of the flicker light source is suppressed by adding the cycle data S1 to S4 read in each cycle. For addition of the cycle data S1 to S4, for example, the DOL synthesis illustrated in FIG. 5 may be used.

Furthermore, in a case where the cycle period Tc is set for each frame period Tf according to the rule as described above, it is possible to determine whether or not the flicker light source is shown by comparing the brightness of the whole or each region between each cycle. That is, in a case where there is a region in which the luminance changes between the cycle data, the region can be determined as a region in which the flicker light source is captured (Hereinafter, referred to as a flicker region.). At that time, the following Formula (1) can be used to detect the flicker region. In Formula (1), cy1 may be statistical data information such as a pixel value of each pixel or an average value using peripheral pixels in the cycle data S1. The same applies to cy2 to cy4.

[Mathematical Formula 1]

$$\sqrt{(cy1-cy2)^2+(cy3-cy4)^2} \tag{1}$$

The value of Formula (1) is zero or a value close to zero for a pixel that does not flicker during one frame period. Therefore, it is possible to specify the flicker region in the frame data by calculating Formula (1) for each pixel. Note that such identification of the flicker region may be executed, for example, in the column processing circuit 103 in FIG. 3 or may be executed in the signal processing unit 108.

Figure 9:
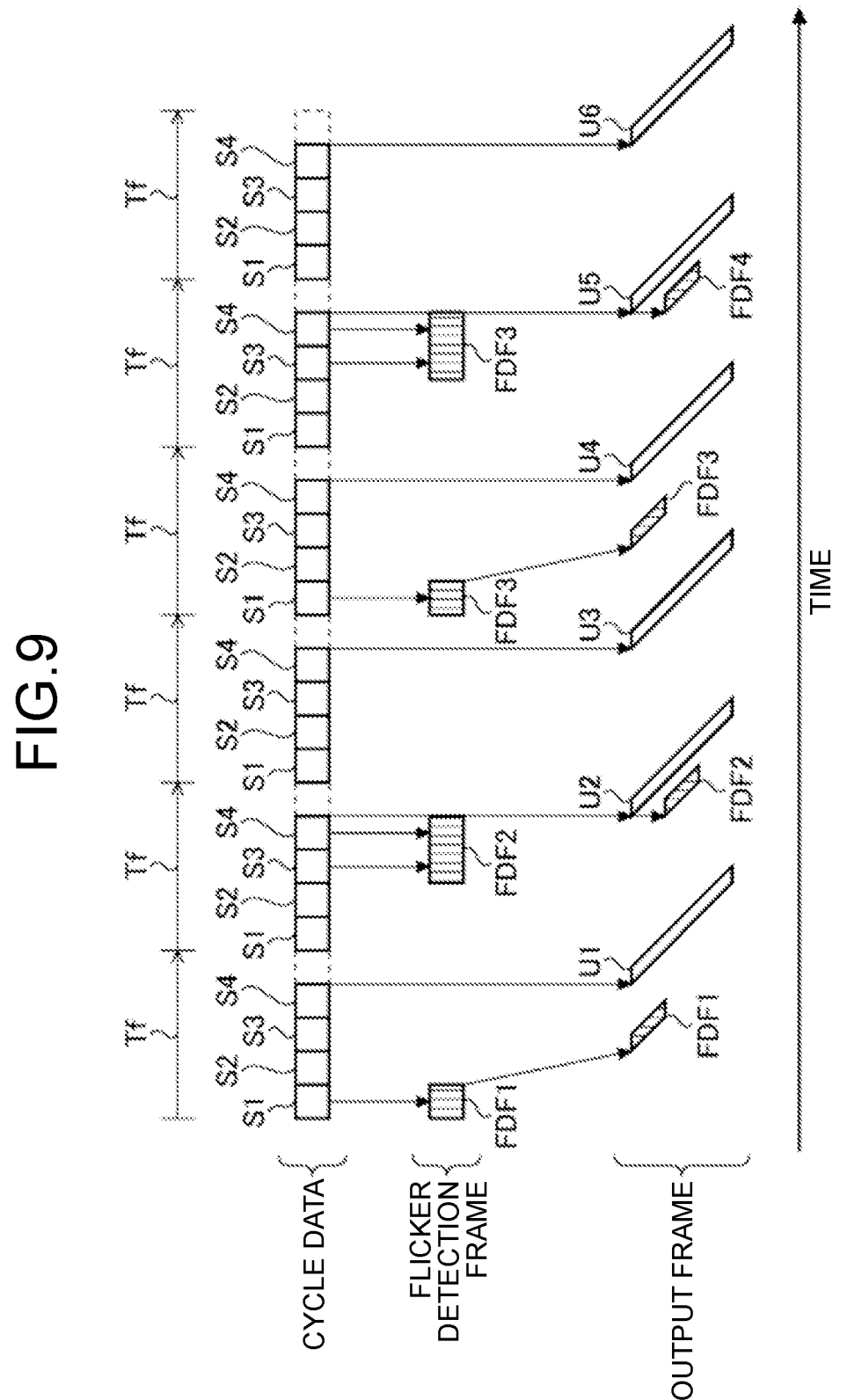
FIG. 9 is a diagram for explaining another example of the readout operation executed by the image sensor in one frame period according to an embodiment.

Furthermore, as illustrated in FIG. 9, in each frame period Tf, image data (Hereinafter, referred to as a flicker detection frame.) FDF1 to FDF4 for detecting the flicker region may be read out separately from the output of the cycle data S1 to S4. Furthermore, the read flicker detection frames FDF1 to FDF4 may be output to the outside in parallel with the frame data.

For the flicker detection frames FDF1 to FDF4, cycle data read in a specific cycle (In the example illustrated in FIG. 9, the cycle is six cycles in between.) may be used without being bound to the separation by the frame period Tf. Furthermore, cycle data or image data obtained by reducing the cycle data may be used for the flicker detection frames FDF1 to FDF4 (see the flicker detection frames FDF1 and FDF3), or image data generated by obtaining an average of two or more cycle data or reduced image data thereof may be used (see the flicker detection frames FDF2 and FDF4). Moreover, the flicker detection frames FDF1 to FDF4 may be image data having the same angle of view as the cycle data, or may be region of interest (ROI) image data of a region detected as a flicker region.

The flicker detection frames FDF1 to FDF4 thus output may be used as frame data for reproducing the flicker of the flicker light source. For example, by synthesizing the frame data and the flicker detection frame so that the region specified as the flicker region in the frame data is replaced with the corresponding region in the flicker detection frame, it is possible to generate frame data in which flicker of the flicker light source is reproduced. However, the present invention is not limited thereto, and the region to be replaced with the flicker detection frame in the frame data may be the frame data or a region specified by image recognition of the luminance value, the frame data, or the like of each region in the flicker detection frame. Furthermore, the synthesis of the frame data and the flicker detection frame may be executed, for example, by the signal processing unit 108 in FIG. 3, or may be executed by another unit such as the travel assistance/automatic driving control unit 29 (see FIG. 1).

However, as described above, in a case where the flicker light source is detected on the basis of flickering, in addition to the flicker light source that actually flickers such as an LED light source, an object that reflects flickering light, a reflecting object that vibrates in small increments, and the like may be detected as the flicker light source. Therefore, in the present embodiment, it may be determined whether or not the flicker light source is an actual flicker light source on the basis of the luminance, color, position in the angle of view, and the like of the flickering subject. For example, a preset luminance value, color information, in-angle-of-view position information, or the like, a luminance value obtained from frame data or the like, color information, in-angle-of-view position information, or the like (for example, an average value of each value, and the like.), a luminance value and/or color information of a region in which luminance protrudes from surroundings or colors are different, or the like may be used as a threshold, and a region having a luminance value higher than the threshold and located, for example, other than the outer peripheral portion within the angle of view may be specified as a flicker region. At that time, it is possible to reduce the amount of computation by discarding the lower bits (for example, a bit corresponding to a threshold value or less) of the pixel value and performing computation using only the upper bits.

Furthermore, not only the cycle data S1 to S4 read in each frame period Tf but also one or more pieces of frame data and/or cycle data before and after the current frame may be used to specify the flicker region. In this case, by setting the region specified as the flicker region to a region including the periphery of the actually flickering region, it is possible to reduce detection omission of the flicker light source due to the angle of view or the movement of the subject in the preceding and subsequent frames.

1.6 Shake Correction

Since an imaging range of the camera 51 attached to the vehicle 1 swings due to the shake of the vehicle 1 or the like, the position of the subject in the image changes with the shake of the vehicle 1. The position change in the image tends to be more noticeable for a farther subject. Therefore, in a case where prediction processing is executed by a method such as a Recurrent Neural Network (RNN) on the image acquired by the camera 51 attached to the vehicle 1, the position (that is, the position of a bounding box) of the subject in the image is not stable, and thus, there is a possibility that the movement of the subject due to the shake of the vehicle 1 is regarded as the movement of the subject itself, and as a result, an incorrect prediction result is derived.

Furthermore, in a case where the subject is a flicker light source such as a traffic light, if the position in the image is not stable, it is difficult to determine whether the subject is a flicker light source or a moving object, and thus, there may be a problem that it is difficult to appropriately specify the flicker region.

Moreover, in a case where one frame data is generated by adding (DOL-synthesizing) the plurality of pieces of cycle data S1 to S4 as in the present embodiment, if focal plane distortion occurs due to fluctuation of the imaging range during one frame period Tf, there is also a problem that image quality degradation such as distortion or blurring may occur in the frame data generated by the addition.

Moreover, in a case where motion-compensated temporal filtering (MCTF) is executed on frame data, the subject unintentionally moves within the angle of view due to the shake of the imaging range, and thus, there is also a problem that the accuracy of motion compensation may decrease.

Therefore, in the present embodiment, information such as a shake direction, a speed, and/or an angular velocity of the camera 51 may be detected using the vehicle sensor 27 (for example, IMU) mounted on the vehicle 1, and shake correction for the frame data may be executed in the image sensor 100 on the basis of the detected information. As a result, since the positional deviation of the same subject between the front and rear frames due to the shake of the imaging range is reduced, for example, it is possible to expect performance improvement (for example, improvement in recognition rate, improvement in MCTF correction performance, reduction in calculation amount, improvement in robustness, and the like) of post-processing executed by the travel assistance/automatic driving control unit 29 or the like.

Furthermore, by performing shake correction on the frame data in the image sensor 100, it is possible to simplify external processing, and thus, it is also possible to reduce the total cost, reduce the module size, and the like. Moreover, by performing shake correction on the frame data in the image sensor 100, an effect that the amount of data output from the image sensor 100 to the external chip can be reduced can also be expected. However, it is not essential to execute shake correction on the frame data in the image sensor 100, and the shake correction may be executed outside the processor 21, the travel assistance/automatic driving control unit 29, and the like.

Figure 10:
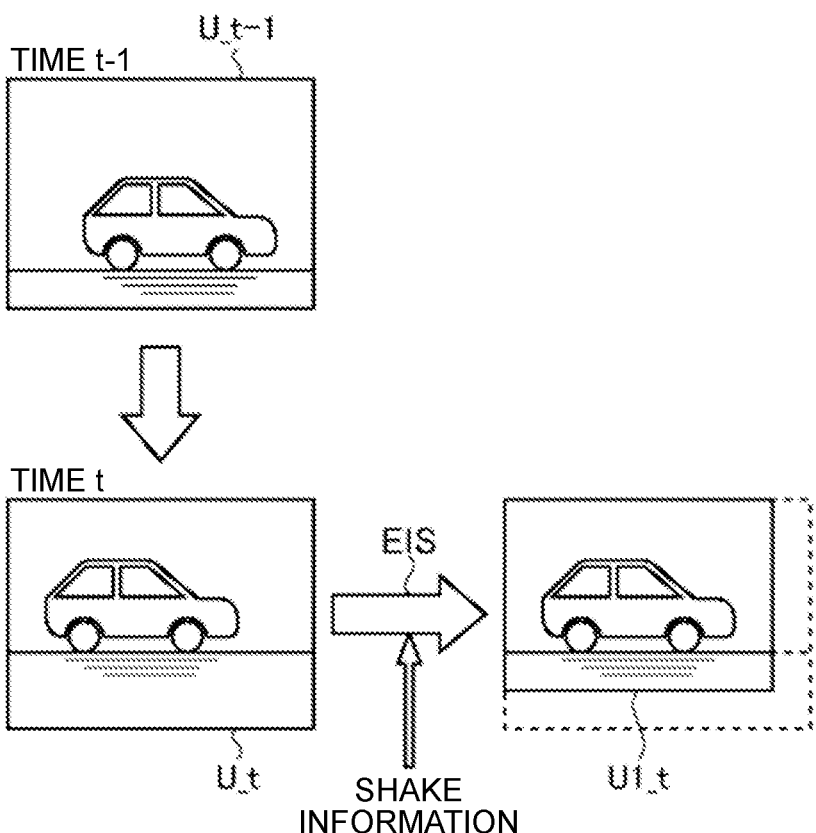
FIG. 10 is a diagram for explaining an example of shake correction according to an embodiment.

In the present embodiment, for example, a technique such as an electric image stabilizer (EIS) may be applied to shake correction with respect to frame data. FIG. 10 is a diagram for explaining an example of shake correction according to the present embodiment. Note that FIG. 10 illustrates a case where frame data U_t–1 is output during the frame period at time t–1 and frame data U_t is output during the frame period at the next time t.

As illustrated in FIG. 10, in the present embodiment, for example, a region to be cut out from the frame data U_t is determined on the basis of information (hereinafter, referred to as shake information) regarding the shake of the vehicle 1, that is, the shake of the camera 51 input from the vehicle sensor 27, and the image data U1_t thus cut out is output as frame data. Note that, in the determination of the cut-out region, the position, range, and the like of the cut-out region determined for the previous frame data may be considered. Furthermore, the shake information can include, for example, information used for general EIS, such as information regarding acceleration, angular velocity, or the like of the camera 51 detected by the IMU or the like of the vehicle sensor 27.

Figure 11:
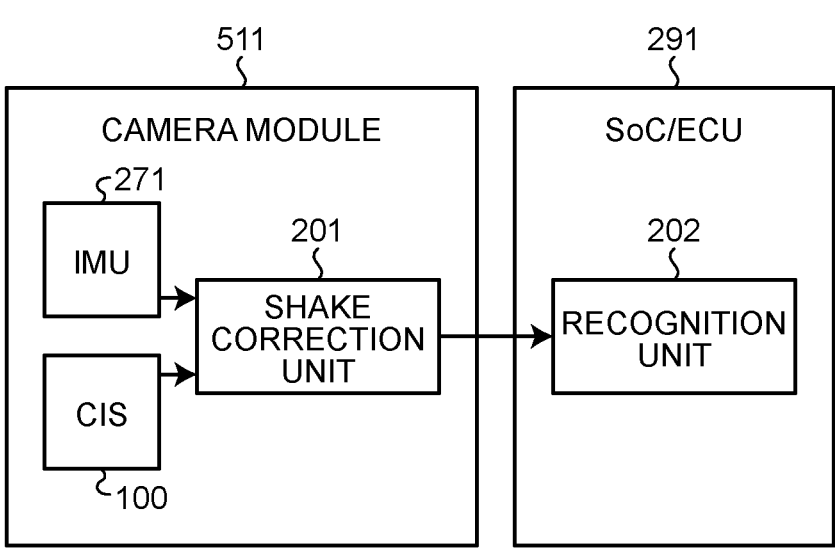
FIG. 11 is a block diagram illustrating a configuration example for implementing shake correction according to an embodiment.
Figure 12:
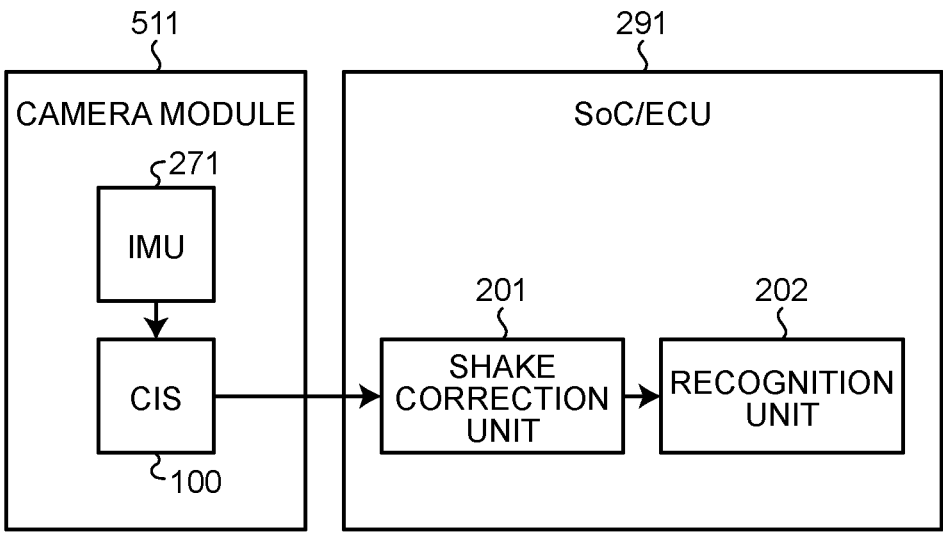
FIG. 12 is a block diagram illustrating another configuration example for implementing shake correction according to an embodiment.

FIG. 11 is a block diagram illustrating a configuration example for implementing shake correction according to the present embodiment, and FIG. 12 is a block diagram illustrating another configuration example for implementing shake correction according to the present embodiment.

First, as illustrated in FIG. 11, the image sensor 100, an IMU 271 in the vehicle sensor 27, and a shake correction unit 201 may be mounted on a chip integrated as a camera module 511, for example. In the camera module 511, the image sensor 100 and the shake correction unit 201 may have a configuration corresponding to the camera 51 in FIG. 1, or may have a configuration built in a single chip such as a laminated chip. Note that the shake correction unit 201 may be implemented in the signal processing unit 108 in FIG. 3, for example.

In such a configuration, the shake correction unit 201 determines a region to be cut out from the frame data on the basis of shake information input from the IMU 271 at the same or substantially the same timing as the timing at which the frame data is input from the image sensor 100. Therefore, the frame data output from the image sensor 100 may be the frame data before the EIS. Frame data generated by such shake correction is input to a recognition unit 202 incorporated in a system on chip (SoC), an electronic control unit (ECU), or the like (Hereinafter, referred to as SoC/ECU 291.), and is used for processing such as image recognition in the recognition unit 202. At that time, shake information used in generating the frame data may be added to the frame data transmitted from the camera module 511 to the SoC/ECU 291. Furthermore, the recognition unit 202 may be, for example, the recognition unit 73 included in the travel assistance/automatic driving control unit 29 in FIG. 1.

Furthermore, in the example illustrated in FIG. 12, the shake correction unit 201 is arranged in the SoC/ECU 291 in a configuration similar to that of the example illustrated in FIG. 11. Furthermore, the IMU 271 inputs the detected shake information to the image sensor 100. In such a configuration, the image sensor 100 adds shake information input from the IMU 271 at the same or substantially the same timing as the timing of generating the frame data to the frame data and transmits the frame data to the SoC/ECU 291. At that time, the image sensor 100 (for example, the signal processing unit 108) may convert shake information input from the IMU 271 into information that can be easily processed by the SoC/ECU 291 and add the information to the frame data.

Upon receiving the frame data to which the shake information is added from the camera module 511, the shake correction unit 201 executes the EIS on the basis of the shake information added to each frame data to generate the frame data after shake correction. The generated frame data is input to the recognition unit 202 and used for processing such as image recognition in the recognition unit 202.

Note that the shake correction unit 201 may execute processing such as MCTF together with shake correction. Furthermore, the shake correction unit 201 may execute processing of correcting focal plane distortion together with shake correction.

Figures 13A, 13B:
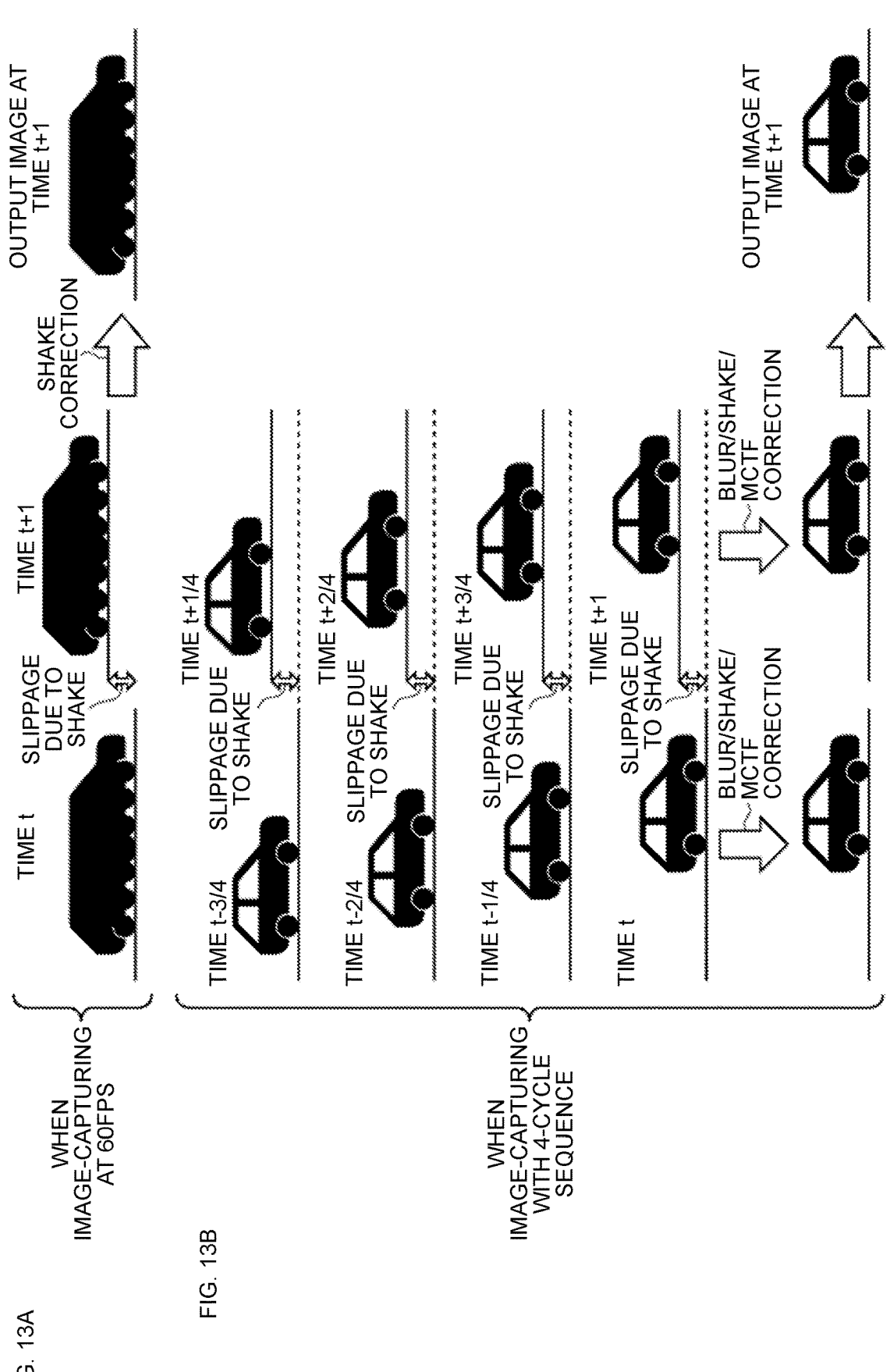
FIGS. 13A and 13B are schematic diagrams for explaining a case where shake correction is applied to a basic operation according to an embodiment.

Next, a case where the above-described shake correction is applied to the basic operation (four-cycle sequence) according to the present embodiment will be described. FIGS. 13A and 13B are schematic diagrams for explaining a case where shake correction is applied to the basic operation according to the present embodiment, in which FIG. 13A is a diagram illustrating shake correction in a case where the 4-cycle sequence is not applied, and FIG. 13B is a diagram illustrating shake correction in a case where the 4-cycle sequence is applied. Note that FIGS. 13A and 13B illustrate a case where each of periods obtained by dividing one frame period Tf from time t to time t+1 into four equal periods is set as one cycle period Tc.

As illustrated in FIG. 13A, in a case where the 4-cycle sequence according to the present embodiment is not applied, blur occurs in each of the frame data at the time t and the frame data at the next time t+1. Therefore, blur generated in each of the frame data at the time t and the frame data at the next time t+1 remains in the shake-corrected frame data output as the output frame at the time t+1.

On the other hand, as illustrated in (b) of FIG. 13B, in a case where blur in the frame data at each time is reduced by applying the 4-cycle sequence according to the present embodiment, blur in the shake-corrected frame data output as the output frame at time t+1 is also reduced. As a result, the accuracy of image recognition and the like can be improved. Note that the SN ratio of each frame data may be improved by executing the MCTF on each frame data.

1.7 Motion Vector Search (ME)

Usually, a position of a vanishing point in an image is specified based on a motion vector obtained for each block obtained by finely dividing the image. On the other hand, in the case of frame data acquired by a camera mounted on a vehicle or the like as in the camera 51 according to the present embodiment, since the traveling direction of the vehicle or the like is substantially constant, the position of the vanishing point in the preceding and following frame data does not change much. Furthermore, the motion vector in each frame data is a vector along a radiation direction centered on the vanishing point. Therefore, in the present embodiment, a search range of the motion vector may be limited on the basis of the position of the vanishing point. This makes it possible to significantly shorten the motion vector search time and improve the accuracy. Note that the motion vector search (ME) according to the present embodiment may be executed by, for example, the signal processing unit 108 in FIG. 3, or may be executed by another unit such as the travel assistance/automatic driving control unit 29 (see FIG. 1).

Figure 14:
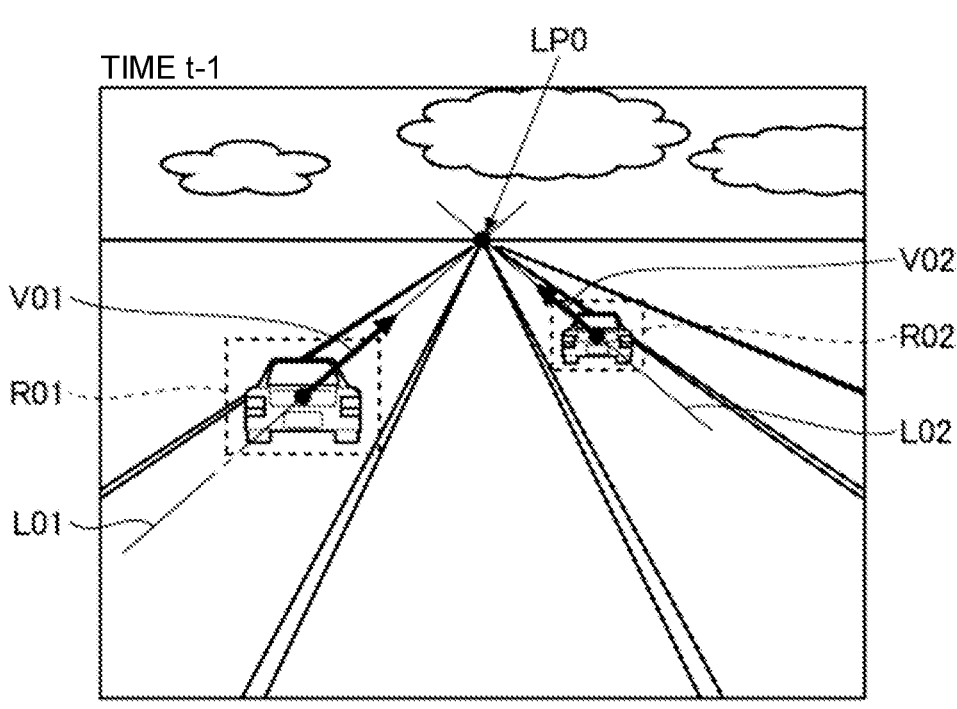
FIG. 14 is a diagram (part 1) for explaining a motion vector search operation according to an embodiment.
Figure 15:
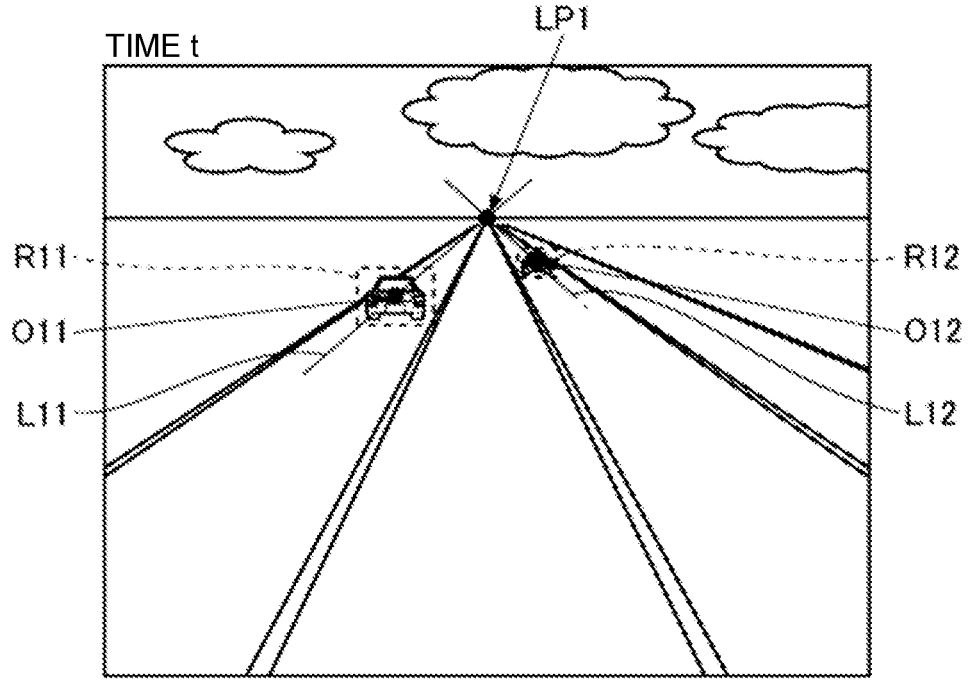
FIG. 15 is a diagram (part 2) for explaining the motion vector search operation according to an embodiment.
Figure 16:
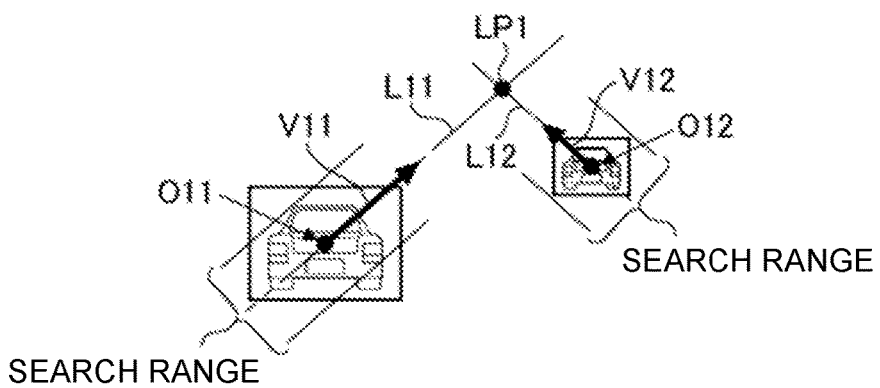
FIG. 16 is a diagram (part 3) for explaining the motion vector search operation according to an embodiment.

FIGS. 14 to 16 are diagrams for explaining a motion vector search operation according to the present embodiment. Note that FIG. 14 illustrates frame data at time t–1 (this is referred to as a previous frame), and FIG. 15 illustrates frame data at time t (this is referred to as a current frame). FIG. 16 is a diagram for explaining a search range of a motion vector for a current frame.

As illustrated in FIG. 14, when motion vectors V01 and V02 of two or more regions of interest (corresponding to a bounding box or a region used for block matching in optical flow calculation) R01 and R02 in the image are obtained with respect to the previous frame at time t–1, the position of a vanishing point LP0 in the previous frame is identified based on the intersection of extension lines L01 and L02 of the motion vectors V01 and V02. Note that, when there are three or more motion vectors, a barycentric position of the intersection, a center of the distribution range, or the like may be determined as the vanishing point.

The position of the vanishing point LP0 of the previous frame specified in this manner is set as, for example, the position of the vanishing point LP1 of the current frame (time t) which is the next frame. In the present embodiment, straight lines L11 and L12 connecting the vanishing point LP1 and center points O11 and O12 of regions of interest R11 and R12 in the current frame are set.

When the straight lines L11 and L12 connecting the vanishing point LP1 and the center points O11 and O12, respectively, are set in this manner, as illustrated in FIG. 22, the search ranges of the motion vectors of the regions of interest R11 and R12 are determined on the basis of the straight lines L11 and L12, respectively. Specifically, a search range is set based on the straight lines L01 and L02 obtained by projecting the straight lines L11 and L12 onto the same coordinates on the previous frame, and a region corresponding to each of the regions of interest R11 and R12 is searched within the range, thereby calculating the motion vectors V11 and V12 of the regions R11 and R12. Note that a width of the search range may be determined, for example, on the basis of the maximum value of the predicted motion vector or the like (the maximum scalar value of the motion vector or the like).

In addition, for example, the width of the search range may be set on the basis of a predicted calculation amount (For example, a restriction is placed on the calculation amount that can occur, and the search range is narrowed so as not to exceed the calculation amount.), may be set on the basis of an installation position (for example, the front, the side, or the like of the vehicle 1) of the camera, may be set on the basis of a distance (For example, the farther the object is, the narrower the search range can be.) to an object included in the region of interest, or may be set on the basis of information (For example, the search range can be narrowed as the vehicle speed is slower.) such as a vehicle speed. However, the present invention is not limited thereto, and the width of the search range may be determined on the basis of various parameters.

However, the position of the vanishing point LP1 in the current frame is not limited to the position of the vanishing point LP0 in the previous frame (corresponding to the above-described previous frame) with respect to the current frame, and may be determined on the basis of the positions of the vanishing points in two or more frames before the current frame. For example, the position of the vanishing point in the current frame may be determined or estimated on the basis of the movement amount and the direction of the position of the vanishing point in two or more frames before the current frame.

Furthermore, the position of the vanishing point also changes depending on the traveling direction of the vehicle 1, the steering situation, and the like. Therefore, the position of the vanishing point LP1 in the current frame may be estimated in consideration of the traveling direction and the steering situation of the vehicle 1. For example, when the vehicle 1 is turning left, the position of the vanishing point in the frame data shifts to the left in the image. Therefore, the position of the vanishing point in the current frame may be estimated based on the position of the vanishing point determined in the previous frame and the turning direction, the turning radius, and the like of the vehicle 1.

Figure 17:
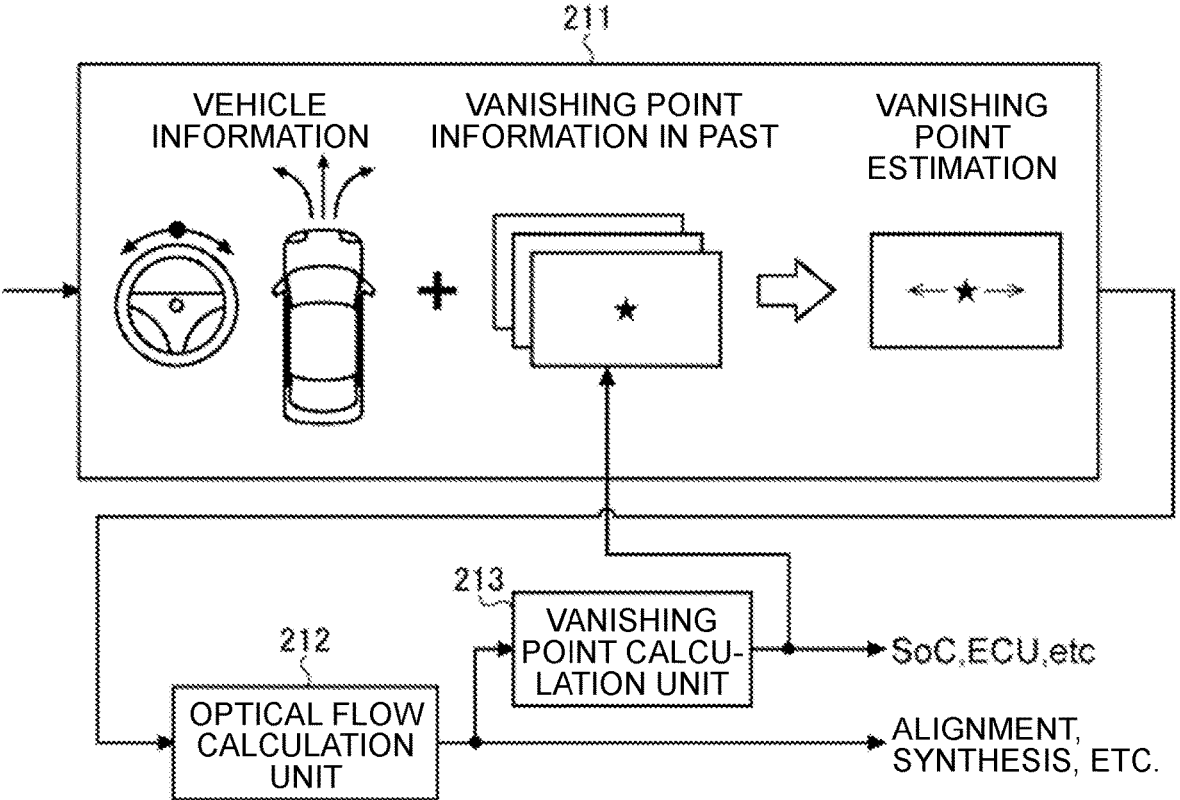
FIG. 17 is a block diagram illustrating a configuration example for implementing a motion vector search according to an embodiment.

FIG. 17 is a block diagram illustrating a configuration example for realizing the motion vector search according to the present embodiment. As illustrated in FIG. 17, the configuration for realizing the motion vector search according to the present embodiment includes, for example, a vanishing point position estimation unit 211, an optical flow calculation unit 212, and a vanishing point calculation unit 213. Note that the configuration for realizing the motion vector search may be realized by, for example, the signal processing unit 108 in FIG. 3, or may be realized by another unit such as the travel assistance/automatic driving control unit 29 (see FIG. 1).

The vanishing point position estimation unit 211 estimates a position of the vanishing point in the current frame based on, for example, vehicle information of the vehicle 1 similarly input to the input current frame and vanishing point information (hereinafter, referred to as past vanishing point information.) specified in one or more previous frames. Note that the vehicle information can include, for example, at least one of odometry information such as a steering angle (a rotation angle of a steering wheel or the like), a detection result of the IMU, vehicle body information (a total length, a vehicle width, a vehicle height), a camera installation position, a posture thereof, a vehicle speed, operation information of a direction indicator, and the like. Furthermore, the past vanishing point information may be held in a memory or the like (for example, the data storage unit 109) not illustrated in the vanishing point position estimation unit 211.

The information on the position of the vanishing point estimated by the vanishing point position estimation unit 211 is input to the optical flow calculation unit 212 together with the frame data of the current frame. For example, the optical flow calculation unit 212 calculates a motion vector (optical flow) for the current frame by the method described above with reference to FIGS. 14 to 16. Then, the optical flow calculation unit 212 inputs the calculated motion vector to the vanishing point calculation unit 213. Note that the calculated motion vector may be input to the signal processing unit 108 or the like in the image sensor 100, for example, and may be used for alignment between frame data or between cycle data in the signal processing unit 108 or the like, addition of cycle data within one frame period (DOL synthesis), or the like.

According to the above configuration, since the motion vectors calculated on the basis of the previous frame and the current frame from which the flicker component has been removed can be used as the motion vectors when the addition (DOL synthesis) of the cycle data is performed, the alignment accuracy of the flicker region can be improved. However, since the frame interval is longer than the cycle interval (For example, as described above, when one frame period is divided into four equal parts, it is quadrupled.), the motion vector used in the addition of the cycle data (DOL synthesis) may be a vector (For example, a vector obtained by multiplying the motion vector calculated by the optical flow calculation unit 212 by Tc/Tf.) obtained by reducing the motion vector calculated by the optical flow calculation unit 212. Furthermore, the motion vector is not limited to between frames, and the motion vector may be calculated between cycles.

However, in this method, since the motion vector is calculated between frames or cycles, in a case where the traveling direction of the vehicle 1 changes, for example, the motion vector of a region where the subject periodically flickers such as a flicker region cannot be corrected according to the change in the traveling direction of the vehicle 1, and an error may be accumulated.

Therefore, in the present embodiment, the flicker region including the surrounding region may be excluded from the motion vector search target. At that time, the surrounding region may be determined based on the maximum movement amount of the subject between cycles (the maximum scalar value of the motion vector or the like). In this case, the motion vector of the region excluded from the motion vector search target may be interpolated using, for example, a motion vector of a region near the region. Furthermore, as the correction for the motion vector interpolated using the motion vector of the neighboring region, for example, the correction for the motion vector executed in the previous frame may be used.

The vanishing point calculation unit 213 specifies the position of the vanishing point in the current frame on the basis of the motion vector input from the optical flow calculation unit 212. For example, as described above, the vanishing point calculation unit 213 specifies the position of the vanishing point in the current frame on the basis of the intersection of the extended lines of the motion vectors calculated for the current frame. The position of the vanishing point specified in this manner is input to the vanishing point position estimation unit 211 and used for position estimation of the vanishing point in the next frame. Furthermore, the position of the specified vanishing point may be output to the outside such as the travel assistance/automatic driving control unit 29 together with the frame data of the current frame, for example.

Note that the region of interest that is the target of the motion vector search may be determined by region determination (for example, region determination and the like executed at the time of noise reduction in the signal processing unit 108, region determination and the like such as other object recognition, and the like) for the frame data, but is not limited thereto. For example, in a case where the camera 51 employs image plane phase difference autofocus (ZAF), the frame data may be segmented on the basis of the circle of confusion observed by ZAF, and the region determined thereby may be determined as the region of interest.

Furthermore, in the search of the motion vector for the region of interest, in a case where distance information to the subject can be acquired by the ZAF, the radar 52, the LiDAR 53, the ultrasonic sensor 54, or the like, the motion vector may be estimated on the basis of the distance information acquired by these.

1.8 Summary

As described above, according to the present embodiment, it is possible to simultaneously achieve generation of an image that is not affected by flicker of the flicker light source and detection of the flicker light source. Furthermore, according to the present embodiment, blur can be suppressed to an extent that does not affect image recognition. Moreover, according to the present embodiment, it is possible to suppress deterioration in image quality at low illuminance. Moreover, according to the present embodiment, it is possible to realize a solid-state imaging device, a method of controlling a solid-state imaging device, and a control program of a solid-state imaging device capable of imaging in a high dynamic range. Moreover, according to the present embodiment, it is possible to realize a solid-state imaging device, a method of controlling a solid-state imaging device, and a control program of a solid-state imaging device that can be used for both detection application and visual recognition application. Moreover, according to the present embodiment, it is possible to realize a solid-state imaging device, a method of controlling a solid-state imaging device, and a control program of a solid-state imaging device that can be expected to improve the accuracy of image recognition.

1.9 Modification Example

In the above-described embodiment, the case where the exposure time at the time of generating one cycle data is shortened by dividing one frame period into the plurality of cycle periods, and the cycle data read in each cycle period is added (DOL-synthesized) to generate frame data with reduced blur and improved SN ratio has been described, but the present invention is not limited to such a method. Therefore, an aspect in which blur can be reduced and an SN ratio can be improved by a method different from the above-described embodiment will be described below. Note that, in the following description, the same configurations and operations as those of the above-described embodiment are cited, and redundant description will be omitted.

Usually, a region where large blur occurs in the frame data is a region where a distance from the image sensor 100 to the subject is short. In such a region, since sufficient brightness can be secured, a good SN ratio can be secured even with a short exposure time.

On the other hand, in a region where the distance to the subject is long, a long exposure time is required to secure a sufficient SN ratio, but blur is less likely to occur because a moving speed of the subject within the angle of view is slow.

Figure 18:
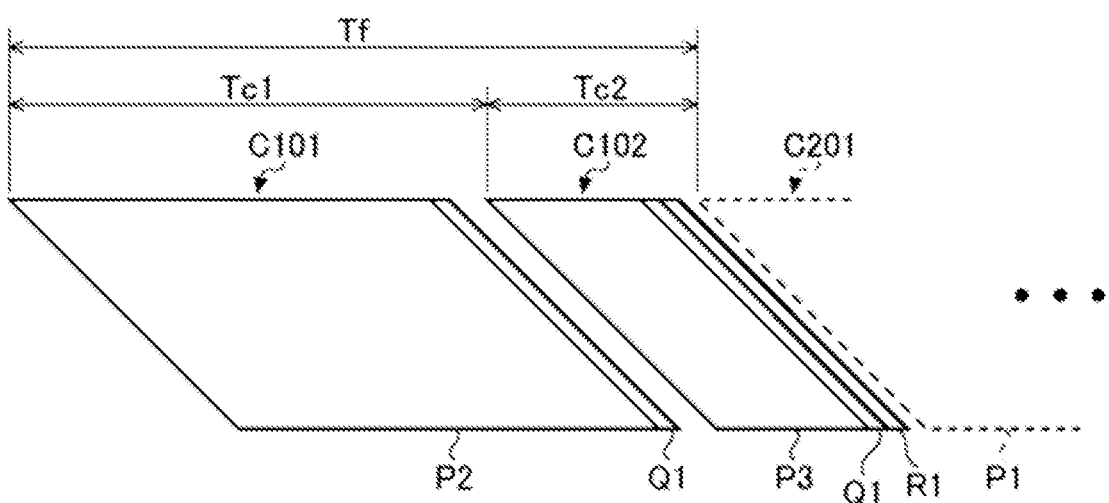
FIG. 18 is a diagram for explaining an example of a readout operation executed by an image sensor in one frame period according to a modification example of an embodiment.

Therefore, in the present modification example, as illustrated in FIG. 18, one frame period Ts is divided into a cycle period Tc1 with a long exposure time and a cycle period Tc2 with a short exposure time, and image data P3 read in the cycle period Tc2 is used for a region with a short distance to the subject, and image data P2 read in the cycle period Tc1 is used for other regions (for example, a region where the distance to the subject is long) to generate frame data. As a result, blur is suppressed at a good SN ratio in a region where the distance to the subject is short, and frame data with small blur can be generated at a sufficient SN ratio in other regions (for example, a region where the distance to the subject is long).

Note that the separation between the region with a short distance to the subject and the other regions may be executed, for example, on the basis of the motion vector calculated in the previous frame. That is, since the subject close to the image sensor 100 moves at a high speed within the angle of view, the motion vector of the subject increases, while the motion vector of the subject far from the image sensor 100 is small. Therefore, by dividing the region on the basis of the size (scalar quantity) of the motion vector, it is possible to divide the region having a short distance to the subject and the other regions.

Note that, in the present modification example, a case where one frame period Ts is divided into two of a cycle period Tc1 having a long exposure time and a cycle period Tc2 having a short exposure time has been exemplified, but the present invention is not limited thereto, and one frame period Ts may be divided into three or more cycle periods. In this case, the image data read in one cycle period may be used for the image data of the region where the distance to the subject is short, and the image data read in two or more cycle periods may be added (DOL-synthesized) to the image data of the region where the distance to the subject is long.

Other configurations, operations, and effects may be similar to those of the above-described embodiment, and thus detailed description thereof is omitted here.

2. Hardware Configuration

Figure 19:
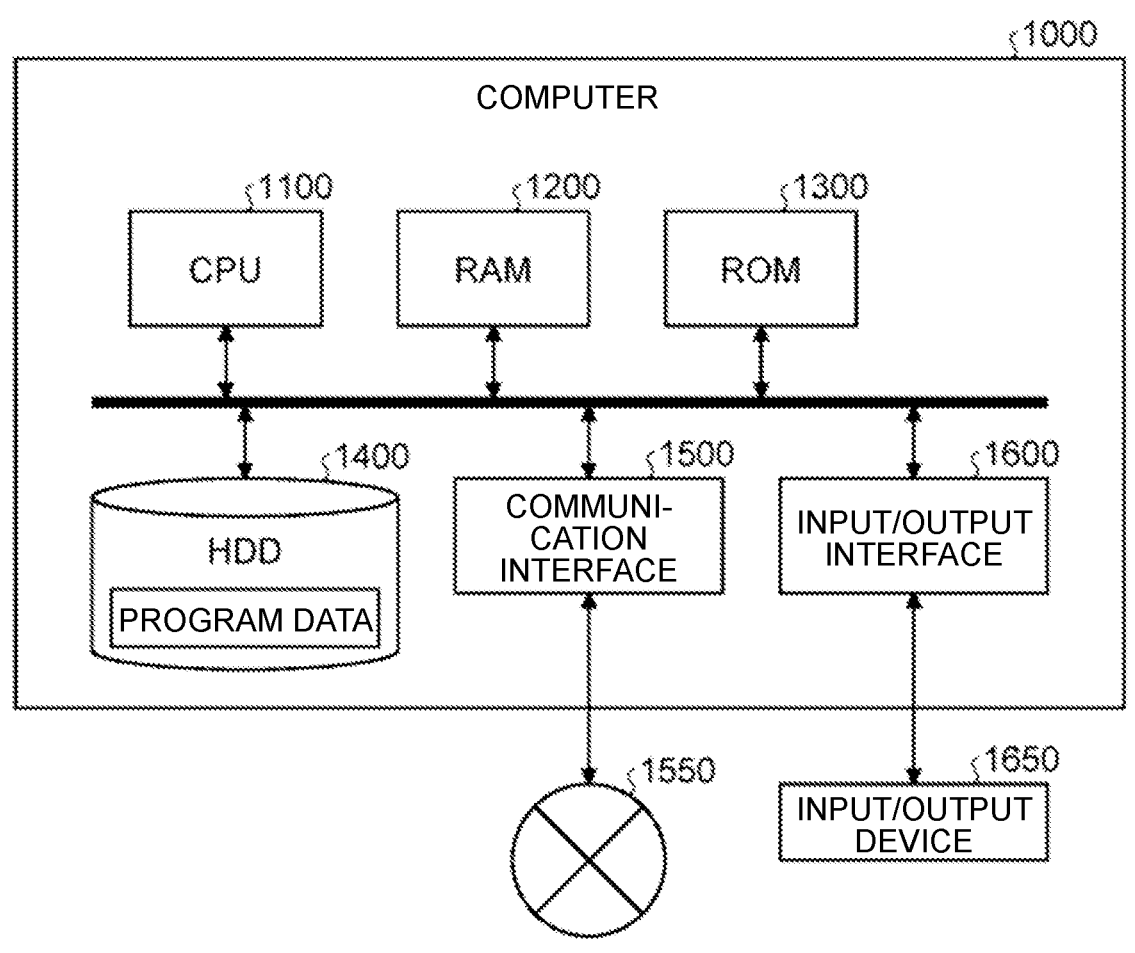
FIG. 19 is a hardware configuration diagram illustrating an example of a computer that implements functions of an information processing device according to the present disclosure.

A recognition unit 120 according to the embodiment, the modification examples thereof, and the application examples described above can be realized by a computer 1000 having a configuration as illustrated in FIG. 19, for example. FIG. 19 is a hardware configuration diagram illustrating an example of the computer 1000 that implements the functions of the information processing device constituting the recognition unit 120. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records a projection control program according to the present disclosure as an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 has a configuration including the I/F unit 18 described above, and is an interface for connecting an input/output device 1650 and the computer 1000. For example, the CPU 1100 receives data from an input device such as a keyboard and a mouse via the input/output interface 1600. Furthermore, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, the CPU 1100 of the computer 1000 functions as the recognition unit 120 according to the above-described embodiment by executing a program loaded on the RAM 1200. Furthermore, the HDD 1400 stores a program and the like according to the present disclosure. Note that the CPU 1100 reads the program data 1450 from the HDD 1400 and executes the program data 1450, but as another example, these programs may be acquired from another device via the external network 1550.

Although the embodiments of the present disclosure have been described above, the technical scope of the present disclosure is not limited to the above-described embodiments as it is, and various modifications can be made without departing from the gist of the present disclosure. Furthermore, components of different embodiments and modification examples may be appropriately combined.

Furthermore, the effects of each embodiment described in the present specification are merely examples and are not limited, and other effects may be provided.

Note that the present technique can also have the following configurations.

(1)

A solid-state imaging device including:

a pixel array unit including a plurality of pixels;

a control unit that reads first image data from the pixel array unit in each of a plurality of cycles in one frame; and a processing unit that generates second image data of the one frame based on a plurality of the first image data read in the one frame.

(2)

The solid-state imaging device according to (1), wherein each of the cycles includes a first period in which a charge generated in the pixels is accumulated and a second period in which a charge generated in the pixels is discarded, and the control unit generates the first image data based on image data read from the pixel array unit in the first period and image data read from the pixel array unit in the second period.

(3)

The solid-state imaging device according to (1), wherein the control unit generates the first image data based on image data read from the pixel array unit and image data at a time of non-exposure held in advance.

(4)

The solid-state imaging device according to any one of (1) to (3), wherein the processing unit generates the second image data by adding the plurality of first image data.

(5)

The solid-state imaging device according to (4), wherein the processing unit generates the second image data by adding the plurality of first image data at a preset ratio.

(6)

The solid-state imaging device according to (4) or (5), wherein the processing unit generates the second image data by adding the plurality of first image data such that ratios of the plurality of first image data are equal to each other.

(7)

The solid-state imaging device according to any one of (4) to (6), wherein the processing unit generates the second image data by making compression and decompression on each of the plurality of first image data and then adding the compressed and decompressed first image data.

(8)

The solid-state imaging device according to (7), wherein the compression includes PWL compression.

(9)

The solid-state imaging device according to any one of (1) to (8), wherein a period of each of the plurality of cycles is identical.

(10)

The solid-state imaging device according to any one of (1) to (8), wherein in the one frame, a period of at least one cycle of the plurality of cycles is different from a period of another cycle.

(11)

The solid-state imaging device according to any one of (1) to (10), wherein the control unit reads third image data from the pixel array unit at a cycle different from each of the cycles in the frame, and the processing unit detects a flicker region that periodically repeats flickering based on the third image data.

(12)

The solid-state imaging device according to any one of (1) to (11), wherein the processing unit makes a correction on a position of a region of a subject included in the plurality of first image data, and generates the second image data based on the plurality of first image data after the correction.

(13)

The solid-state imaging device according to (12), wherein the processing unit makes a correction on a position of the subject in the plurality of first image data based on a motion vector of the region of the subject.

(14)

The solid-state imaging device according to (13), wherein the motion vector of the region of the subject includes a vector based on a motion vector calculated based on second image data of one or more frames before a current frame.

(15)

The solid-state imaging device according to (13) or (14), wherein the processing unit specifies a vanishing point in second image data of a previous frame, and calculates a motion vector of a region of the subject included in the second image data of a current frame based on the specified vanishing point.

(16)

The solid-state imaging device according to (15), wherein the processing unit limits a range in which the motion vector is searched based on a straight line connecting the vanishing point and a center of the region of the subject, and calculates the motion vector by searching for the motion vector within the limited range.

(17)

The solid-state imaging device according to any one of (12) to (16), wherein the processing unit makes a correction on the position of the region of the subject included in the plurality of first image data based on acceleration and/or angular velocity information input from an outside.

(18)

The solid-state imaging device according to any one of (12) to (17), wherein the processing unit sets the region of the subject based on at least one of an image plane phase difference when the subject is imaged and a distance to the subject detected by an external sensor when the subject is imaged.

(19)

The solid-state imaging device according to any one of (1) to (18), wherein the plurality of cycles is four cycles.

(20)

The solid-state imaging device according to any one of (1) to (19), wherein at least one of the plurality of cycles accumulates a charge generated in the pixel and includes a third period shorter than the first period and the second period.

(21)

A method of controlling a solid-state imaging device, the method including:

reading first image data from a pixel array unit including a plurality of pixels in each of a plurality of cycles in one frame; and generating second image data of the one frame based on a plurality of the first image data read in the one frame.

(22)

A control program for a solid-state imaging device, the control program causing a computer to execute:

a step of reading first image data from a pixel array unit including a plurality of pixels in each of a plurality of cycles in one frame; and a step of generating second image data of the one frame based on a plurality of the first image data read in the one frame.

REFERENCE SIGNS LIST

100 SOLID-STATE IMAGING DEVICE
101 PIXEL ARRAY UNIT
102 VERTICAL DRIVE CIRCUIT
103 COLUMN PROCESSING CIRCUIT
104 HORIZONTAL DRIVE CIRCUIT
105 SYSTEM CONTROL UNIT
108 SIGNAL PROCESSING UNIT
109 DATA STORAGE UNIT
111, 124, 134, 147 DATA COMPRESSION UNIT
112, 121, 125, 131, 135, 141, 144, 145 MEMORY
113, 126, 136 DATA DECOMPRESSION UNIT
114, 122, 127, 132, 137, 142 DIVIDER
123, 133, 143 ADDER
146 HDR SYNTHESIS UNIT
201 SHAKE CORRECTION UNIT
202 RECOGNITION UNIT
211 VANISHING POINT POSITION ESTIMATION UNIT
212 OPTICAL FLOW CALCULATION UNIT
213 VANISHING POINT CALCULATION UNIT
271 IMU
291 SoC/ECU
511 CAMERA MODULE

The invention claimed is:

1. A solid-state imaging device, comprising:

a pixel array unit including a plurality of pixels; and circuitry configured to:

read first image data from the pixel array unit in each cycle of a plurality of cycles in a first frame, wherein a plurality of pieces of the first image data is read in the plurality of cycles in the first frame;

execute compression and decompression on each of the plurality of pieces of the first image data read in the first frame;

add the plurality of pieces of the first image data that is compressed and decompressed; and generate second image data of the first frame based on the addition of the plurality of pieces of the first image data that is compressed and decompressed.

2. The solid-state imaging device according to claim 1, wherein the each cycle of the plurality of cycles includes a first period and a second period, a charge generated in the plurality of pixels is accumulated in the first period, the charge generated in the plurality of pixels is discarded in the second period, and the circuitry is further configured to generate the first image data based on third image data read from the pixel array unit in the first period and fourth image data read from the pixel array unit in the second period.

3. The solid-state imaging device according to claim 1, wherein the circuitry is further configured to generate the first image data based on third image data read from the pixel array unit, and fourth image data at a time of non-exposure, wherein the fourth image data is held prior to the read of the third image data.

4. The solid-state imaging device according to claim 1, wherein the circuitry is further configured to:

divide the plurality of pieces of the first image data based on a specific ratio;

add the plurality of pieces of the first image data divided at the specific ratio; and generate the second image data based on the addition of the plurality of pieces of the first image data divided at the specific ratio.

5. The solid-state imaging device according to claim 1, wherein the circuitry is further configured to:

add the plurality of pieces of the first image data such that a ratio of a first piece of the plurality of pieces of the first image data is equal to a ratio of a second piece of the plurality of pieces of the first image data; and generate the second image data based on the addition of the plurality of pieces of the first image data.

6. The solid-state imaging device according to claim 1, wherein the compression includes Piecewise Linear (PWL) compression.

7. The solid-state imaging device according to claim 1, wherein a period of the each cycle of the plurality of cycles is identical.

8. The solid-state imaging device according to claim 1, wherein in the first frame, a period of at least a first cycle of the plurality of cycles is different from a period of a second cycle of the plurality of cycles.

9. The solid-state imaging device according to claim 1, wherein the circuitry is further configured to:

read third image data from the pixel array unit at a specific cycle in the first frame, wherein the specific cycle is different from the each cycle of the plurality of cycles in the first frame; and detect a flicker region in the first frame based on the third image data, wherein the flicker region includes a subject that periodically flickers.

10. The solid-state imaging device according to claim 1, wherein the circuitry is further configured to:

execute a correction process on a position of a first region of a subject included in the plurality of pieces of the first image data; and generate the second image data based on the plurality of pieces of the first image data after the correction process.

11. The solid-state imaging device according to claim 10, wherein the circuitry is further configured to execute the correction process on the position of the first region of the subject in the plurality of pieces of the first image data, based on a first motion vector of the first region of the subject.

12. The solid-state imaging device according to claim 11, wherein the circuitry is further configured to:

calculate a second motion vector based on third image data of a second frame, wherein the second frame is prior to the first frame; and calculate the first motion vector of the first region of the subject based on the second motion vector.

13. The solid-state imaging device according to claim 11, wherein the circuitry is further configured to:

specify a vanishing point in third image data of a second frame, wherein the second frame is prior to the first frame; and calculate a second motion vector of a second region of the subject in the second image data of the first frame based on the specified vanishing point.

14. The solid-state imaging device according to claim 13, wherein the circuitry is further configured to:

limit a range of search of the second motion vector based on a straight line, wherein the straight line connects the vanishing point and a center of the second region of the subject; and calculate the second motion vector based on the limited range of the search of the second motion vector.

15. The solid-state imaging device according to claim 10, wherein the circuitry is further configured to:

acquire at least one of acceleration information or angular velocity information associated with the solid-state imaging device from an external sensor; and execute the correction process on the position of the first region of the subject in the plurality of pieces of the first image data based on the acquired at least one of the acceleration information or the angular velocity information.

16. The solid-state imaging device according to claim 10, wherein the circuitry is further configured to set the first region of the subject based on at least one of an image plane phase difference in a case where the subject is imaged, and a distance to the subject detected by an external sensor in a case where the subject is imaged.

17. A method of controlling a solid-state imaging device, the method comprising:

reading first image data from a pixel array unit in each cycle of a plurality of cycles in a frame, wherein the pixel array unit includes a plurality of pixels, and a plurality of pieces of the first image data is read in the plurality of cycles in the frame;

executing compression and decompression on each of the plurality of pieces of the first image data read in the frame;

adding the plurality of pieces of the first image data that is compressed and decompressed; and generating second image data of the frame based on the addition of the plurality of pieces of the first image data read in the frame that is compressed and decompressed.

18. A non-transitory computer-readable medium having stored thereon, computer-executable instructions which, when executed by a computer, cause the computer to execute operations for a solid-state imaging device, the operations comprising:

reading first image data from a pixel array unit in each cycle of a plurality of cycles in a frame, wherein the pixel array unit includes a plurality of pixels, and a plurality of pieces of the first image data is read in the plurality of cycles in the frame;

executing compression and decompression on each of the plurality of pieces of the first image data read in the frame;

adding the plurality of pieces of the first image data that is compressed and decompressed; and generating second image data of the frame based on the addition of the plurality of pieces of the first image data read in the frame that is compressed and decompressed.

* * * * *